US 6,487,208 B1
Nov. 26, 2002

(12) United States Patent
Chirashnya et al.

(54) ON-LINE SWITCH DIAGNOSTICS

(75) Inventors: Igor Chirashnya, Haifa (IL); Nick Rash, Poughkeepsie, NY (US); Leah Shalev, Zichron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/393,587

(22) Filed: Sep. 9, 1999

(51) Int. Cl.[7] ................................................. H04B 7/00
(52) U.S. Cl. ....................................................... 370/400
(58) Field of Search ........................ 370/426, 362–369, 370/324, 248–249, 398, 390, 422–423, 447, 389, 400, 335, 388, 387, 355, 219, 238–244, 252–255, 395, 471, 259, 217, 466, 352; 379/335, 201; 714/724, 734, 798; 709/200, 219, 226

(56) References Cited

U.S. PATENT DOCUMENTS

| | | |
|---|---|---|
| 5,081,598 A | 1/1992 | Bellows et al. |
| 5,271,000 A * | 12/1993 | Engbersen et al. ......... 370/244 |
| 5,291,593 A | 3/1994 | Abrahams et al. |
| 5,295,256 A | 3/1994 | Bapat |
| 5,313,630 A | 5/1994 | Namioka et al. |
| 5,337,262 A | 8/1994 | Luthi et al. |
| 5,341,478 A | 8/1994 | Travis, Jr. et al. |
| 5,390,325 A | 2/1995 | Miller |
| 5,414,812 A | 5/1995 | Filip et al. |
| 5,421,004 A | 5/1995 | Carpenter et al. |
| 5,438,673 A | 8/1995 | Court et al. |
| 5,453,933 A | 9/1995 | Wright et al. |
| 5,479,473 A * | 12/1995 | Zey ............................. 370/248 |
| 5,499,365 A | 3/1996 | Anderson et al. |
| 5,504,892 A | 4/1996 | Atsatt et al. |
| 5,564,048 A | 10/1996 | Eick et al. |
| 5,602,990 A | 2/1997 | Leete |
| 5,606,661 A | 2/1997 | Wear et al. |
| 5,745,675 A | 4/1998 | Herbig et al. |
| 5,812,529 A | 9/1998 | Czarnik et al. |
| 5,881,131 A * | 3/1999 | Farris et al. ................ 379/201 |
| 5,881,237 A | 3/1999 | Schwaller et al. |
| 6,272,127 B1 * | 8/2001 | Golden et al. .............. 370/352 |

OTHER PUBLICATIONS

Nguyen, Huy et al, "Partial Reset Methodologies for Improving Random–Pattern Testability and BIST of Sequential Circuits", 1997, IEEE, pp. 199–204.*

May, C.J. et al, "Towards a Self–Healing Intelligent Network", 1991, IEEE, pp. 655–659.*

Java Management API (JMAPI), http://java.sun.com/products/JavaManagement.

The RS/6000 SP High–Performance Communication Network, http://www.rs6000.ibm.com/resource/technology/sp_sw1/spswp1.book_1.html.

UML Finite State Machine Diagrams, Robert C. Martin, Engineering Notebook col., C++ Report, Jun. 1998.

* cited by examiner

Primary Examiner—Kwang Bin Yao
Assistant Examiner—Prenell Jones
(74) Attorney, Agent, or Firm—Darby & Darby

(57) ABSTRACT

In a computer network system that includes a multiplicity of nodes interconnected by a network of switches, each switch having multiple ports, a method for testing one of the switches includes assigning a respective one of the nodes to each of a plurality of the ports of the switch being tested. The network is configured so that the switch being tested is substantially isolated from data flow from and to the nodes in the network that are not assigned to the ports of the switch. Data are conveyed at a controlled rate between two or more of the assigned nodes through the respective ports, and behavior of the switch is observed in response to the data being conveyed.

40 Claims, 10 Drawing Sheets

ON-LINE SWITCH DIAGNOSTICS

CROSS-REFERENCE TO RELATED APPLICATIONS

This application is related to U.S. patent applications entitled "Switch Adapter Testing" and "Error Injection Apparatus and Method," filed on even date, which are assigned to the assignee of the present patent application and are incorporated herein by reference.

FIELD OF THE INVENTION

The present invention relates generally to packet-switched computer networks, and specifically to methods and apparatus for testing and diagnosing malfunctions in such networks.

BACKGROUND OF THE INVENTION

Packet-switched, source-routing computer networks are used in a growing range of applications. Such networks link multiple computer processors, or nodes, via multiple switches. Typically, a packet of data sent from one of the nodes to another passes through a number of different switches. Each switch along the way reads routing information, which is commonly contained in a header of the data packet, and passes the packet on to the next switch along the way, or to the destination node. Typically, there are multiple different paths available through the network over which any given pair of nodes can communicate. An example of this type of network is the well-known Asynchronous Transfer Mode (ATM) network, which is used in communications between separate computers. Such networks are also used in multi-processor computers, such as the RS/6000 Scalable POWERParallel System (SP) series of computers produced by International Business Machines Corporation (Armonk, N.Y.). In the SP computer, as well as in certain other networks, successive packets in a communication stream between the nodes may be sent over different routes.

Because of the complex topology and hardware of packet-switched networks, when a fault occurs in such a network it can be difficult to identify the exact location and nature of the fault. The difficulty is exacerbated by the fact, noted above, that by their nature such networks use multiple different paths between nodes and are fault-tolerant. A network fault will typically appear not as a total breakdown (which would be relatively easy to find), but rather will present more subtle symptoms. For example, there may be a reduction in throughput between some or all of the nodes, or an increase in the number of "bad packets"—data packets whose content is corrupted and must be discarded—at one or more of the nodes.

There are few efficient tools known in the art for diagnosis of such faults. The diagnostic process is time-consuming and heavily reliant on the intuition and experience of a human system administrator (or service engineer) in deciphering and drawing conclusions from the limited information that is available. This information is typically collected in various system files, such as topology files, error logs and trace files, as are known in the art. These files may be recorded at different nodes of the network and must somehow be collated and analyzed by the administrator. Because few network administrators have the know-how to perform this sort of diagnosis, costly service calls are frequently required.

A further problem in diagnosing network faults is non-deterministic failures, which may occur only under certain conditions, and may not arise at all while the diagnostic tests are being performed. Such failures are referred to with terms such as "sporadic," "intermittent," "overheating," "lightning," "aging," or "statics," which generally mean only that the cause of the problem is unknown. For example, a high-speed switch or adapter may behave normally in light traffic, and break down only under certain particular stress conditions. At times the only way to find such a problem is to systematically bombard each suspect component of the network with packets from different sources, at controlled rates, gradually eliminating components from consideration until the failure is found. Such a process is difficult to automate, and may require that the network be taken off-line for an extended period. The cost of such down-time for prolonged testing and repair can be enormous. There is therefore a need for systematic methods of diagnostic testing, which can be performed while the network is on-line.

There is a similar lack of tools and techniques for systematically testing the response of switch-related network software to hardware fault conditions. Such techniques are needed particularly in software development and testing stages, to ensure that the software responds properly when faults occur. Current methods of testing use specially-designed simulation hardware, such as cables with broken pins, together with debugging clauses that can be activated in the software itself and dedicated debugging fields in associated data structures. The fault situations created by such methods, however, are limited to a small range of scenarios, which are for the most part different from the real hardware faults that occur in actual networks. Similarly, the software used in debugging mode for fault simulation is different from the actual software product that will be used in the field. Moreover, these testing tools are incapable of simulating the type of transient, non-deterministic failures described above. They do not allow errors to be injected and altered on the fly during a simulation.

SUMMARY OF THE INVENTION

It is an object of some aspects of the present invention to provide improved methods for fault simulation and diagnostics in packet-switched data networks.

It is a further object of some aspects of the present invention to provide diagnostic methods and apparatus for use in testing a switch in a network while the network is on-line.

Preferred embodiments of the present invention operate in the context of a packet data network, which comprises a plurality of nodes, or processors, mutually coupled by a plurality of switches, such that typically any one of the nodes can communicate with any other one of the nodes, preferably over multiple links. Each of the nodes is coupled to a respective port of one of the switches by a switch adapter, which performs data link functions, as are known in the art, with respect to each data packet sent or received through the network by the node. One of the nodes is a primary node, which manages the configuration of elements of the network, such as the other nodes and switches in the network.

In preferred embodiments of the present invention, the primary node controls testing and diagnosis of elements of the network in real time, while the network is on-line, or at least with minimal interruption of on-line operation, by appropriately setting parameters of the nodes and switches. The testing preferably includes diagnostic testing to locate suspected faults in the switches and switch adapters. Additionally or alternatively, for the purposes of testing, errors are intentionally injected into the network so as to simulate the response of the network elements to faults that may occur.

In some preferred embodiments of the present invention, a switch that is suspected of being faulty is isolated from the remainder of the network for testing, while the remainder of the network continues to operate in a substantially normal fashion. The suspect switch has multiple ports, each of which may be connected either to a node or to a port of another switch. Data packets are passed through the switch via different pairs of the ports, at controllable, preferably high rates, until conditions are created in which the switch fails, or until it is ascertained that the switch is not faulty. By isolating the suspect switch in this manner, it is possible to test the switch quickly and thoroughly, while minimizing interruption to the rest of the network.

Preferably, for every port of the suspect switch, the primary node assigns one of the nodes of the network to be an assistant node. Preferably, the assistant nodes are chosen to be the nodes closest in the network to the respective ports of the suspect switch. The assistant nodes do not need to be connected directly to the respective ports, but may rather be connected through other switches in the network. The assistant nodes are taken off-line in order to isolate the suspect switch. They are then controlled by the primary node to transmit heavy data traffic through the suspect switch, either through specific pairs or combinations of ports, or through all of the ports at once. The primary node receives from the assistant nodes records of the data packets that they have sent and/or received through the suspect switch and analyzes the records for any discrepancies, which are indicative of the fault in the switch.

Preferably, the primary node assigns the links over which the assistant nodes are to communicate with their respective ports on the suspect switch by downloading appropriate entries to a route table of the switch adapter of each of the assistant nodes. Typically, in normal network operation, such a route table includes several different routing links over which the node is to communicate, and the switch adapter sends data packets in alternation over the different links in order to balance the data traffic load among different switches and ports in the network. In preferred embodiments of the present invention, however, the entries downloaded to the route tables associated with the assistant nodes indicate that all of the packets are to be sent over the same links, so as to control and maximize the traffic load on the ports of the suspect switch.

There is therefore provided, in accordance with a preferred embodiment of the present invention, in a computer network system that includes a multiplicity of nodes interconnected by a network of switches, each switch having multiple ports, a method for testing one of the switches, including:

assigning a respective one of the nodes to each of a plurality of the ports of the switch being tested;

configuring the network so that the switch being tested is substantially isolated from data flow from and to the nodes in the network that are not assigned to the ports of the switch;

conveying data at a controlled rate between two or more of the assigned nodes through the respective ports; and observing behavior of the switch in response to the data being conveyed.

Preferably, assigning the respective one of the nodes includes selecting a node that is connected to the respective port by a short path through the network relative to other nodes in the system.

Further preferably, configuring the network includes taking the switch being tested and the nodes assigned to the ports thereof off-line, while normal data transmission continues among other nodes and switches in the system.

Preferably, conveying the data includes transmitting data from at least one of the assigned nodes to at least one other of the assigned nodes through the corresponding ports at a substantially maximal transmission rate that the transmitting node can achieve. Further preferably, conveying the data includes conveying data through a selected pair of the ports of the switch being tested or, alternatively or additionally, conveying data through substantially all of the ports of the switch being tested.

Preferably, conveying the data includes conveying data packets, wherein observing the behavior of the switch includes comparing a number of data packets sent by at least one of the assigned nodes, to the number of packets received by one or more other assigned nodes and noting a discrepancy between the numbers. In a preferred embodiment, in normal operation of the system, the data packets are routed between any pair of the nodes over a plurality of different routes in alternation, and conveying the data includes routing substantially all of the packets conveyed from a first one of the assigned nodes to a second one of the assigned nodes over one assigned route through the switch being tested. Most preferably, the nodes are linked to the network by respective data link adapters, each of which routes data from the respective node through the network in accordance with a routing table stored in a memory thereof, and wherein routing substantially all of the packets includes downloading to the adapter of the first one of the assigned nodes a test routing table containing the assigned route.

There is additionally provided, in accordance with a preferred embodiment of the present invention, in a computer network system that includes a multiplicity of nodes interconnected by a network of switches, wherein the nodes are linked to the network by respective data link adapters, each of which in normal operation routes data packets from a corresponding one of the nodes through the network to a given destination node over a plurality of different routes in alternation, a method for testing of the system, including:

selecting at least one of the data link adapters;

programming the selected data link adapter so that substantially all of the data packets sent from the corresponding node to the given destination node are routed in repetition over a single route;

conveying data from the corresponding node to the destination node over the single route; and observing operation of the system responsive to the conveyed data so as to identify a fault in the system.

Preferably, the selected data link adapter routes the data packets in accordance with a routing table stored in a memory, and programming the selected data link adapter includes downloading a test routing table to the memory, responsive to which the data packets are routed in repetition over the single route. In a preferred embodiment, the routing table normally contains multiple entries corresponding to the given destination node, each entry indicating one of the plurality of different routes, from among which entries the switch adapter in normal operation chooses the routes in alternation, and downloading the test routing table includes downloading a table including a plurality of identical entries corresponding to the given destination node.

There is moreover provided, in accordance with a preferred embodiment of the present invention, in a computer network system that includes a multiplicity of nodes interconnected by a network of switches, wherein the nodes are linked to the network by respective data link adapters, each of which routes data from the respective node through the network in accordance with a normal routing table stored in a memory thereof, a method for testing of the system, including:

selecting at least one of the data link adapters;

downloading to the selected data link adapter a respective test routing table, which differs substantially from the normal routing table thereof;

conveying data from the selected data link adapter through the network in accordance with the test routing table; and observing operation of the system responsive to the conveyed data so as to identify a fault therein.

There is furthermore provided, in accordance with a preferred embodiment of the present invention, a manageable computer network system, including:

a network of switches, each switch having multiple ports; and a multiplicity of nodes interconnected by the switches, wherein the nodes include a management node, which carries out a diagnostic test of a selected one of the switches by assigning a respective one of the nodes to each of a plurality of the ports of the selected switch, and by configuring the network so that the selected switch is substantially isolated from data flow from and to the remaining nodes in the network that are not assigned to the ports of the switch, and which issues a command to one or more of the nodes assigned to the ports to perform the test by conveying data at a controlled rate to another one or more of the assigned nodes through the respective ports, and receives information from the nodes in response to the test in order to detect a fault of the selected switch.

Preferably, the management node takes the selected switch and the nodes assigned to the ports thereof off-line, while normal data transmission continues among other nodes and switches in the system.

Further preferably, the network includes a packet-switched network.

There is also provided, in accordance with a preferred embodiment of the present invention, a manageable computer network system, including:

a multiplicity of nodes;

a network of switches, each switch having multiple ports; and a multiplicity of data link adapters, each linking a respective one of the nodes to one of the ports of one of the switches, each of which adapters in normal operation routes data packets from the respective node through the network to a given destination node over a plurality of different routes in alternation, wherein in a test mode of the system, at least one of the data link adapters is selected and programmed so that substantially all of the data packets sent from the corresponding node to the given destination node are routed in repetition over a single route, so that operation of the system can be observed while data are conveyed over the single route in order to identify a fault in the system.

Preferably, the selected data link adapter includes a memory and routes the data packets in accordance with a routing table stored in the memory, and a test routing table is downloaded to the selected adapter, responsive to which the data packets are routed in repetition over the single route. Further preferably, the routing table normally contains multiple entries corresponding to the given destination node, each entry indicating one of the plurality of different routes, and from among which entries the switch adapter in normal operation chooses the routes in alternation, and the test routing table includes a plurality of identical entries corresponding to the given destination node.

There is additionally provided, in accordance with a preferred embodiment of the present invention, a computer software product for testing a selected one of a plurality of switches, each switch having multiple ports, in a computer network system including a multiplicity of processor nodes coupled to the switches, one of which nodes is designated a primary node, the product including computer-readable code, which is read by the primary node, causing the primary node to assign a respective one of the nodes to each of a plurality of the ports of the selected switch, to configure the network so that the switch being tested is substantially isolated from data flow from and to the remaining nodes in the network that are not assigned to the ports of the switch, to cause data to be conveyed at a controlled rate between two of more of the assigned nodes through the respective ports of the switch, and to observe behavior of the switch while the data are being conveyed.

There is furthermore provided, in accordance with a preferred embodiment of the present invention, a computer software product for performing diagnostic testing in a computer network system that includes a multiplicity of nodes interconnected by a network of switches, wherein the nodes are linked to the network by respective data link adapters, each of which in normal operation routes data packets from a corresponding one of the nodes through the network to a given destination node over a plurality of different routes in alternation, the product including computer-readable code, which is read by a selected node among the multiplicity of nodes and causes the node to program a selected data link adapter so that substantially all of the data packets sent from the corresponding node to the given destination node are routed in repetition over a single route, whereby when data are transmitted from the corresponding node to the destination node over the single route, operation of the system responsive to the conveyed data is observed so as to identify a fault in the system.

The present invention will be more fully understood from the following detailed description of the preferred embodiments thereof, taken together with the drawings in which:

DETAILED DESCRIPTION OF PREFERRED EMBODIMENTS

Overview of a Manageable Switch Network

Figure 1:
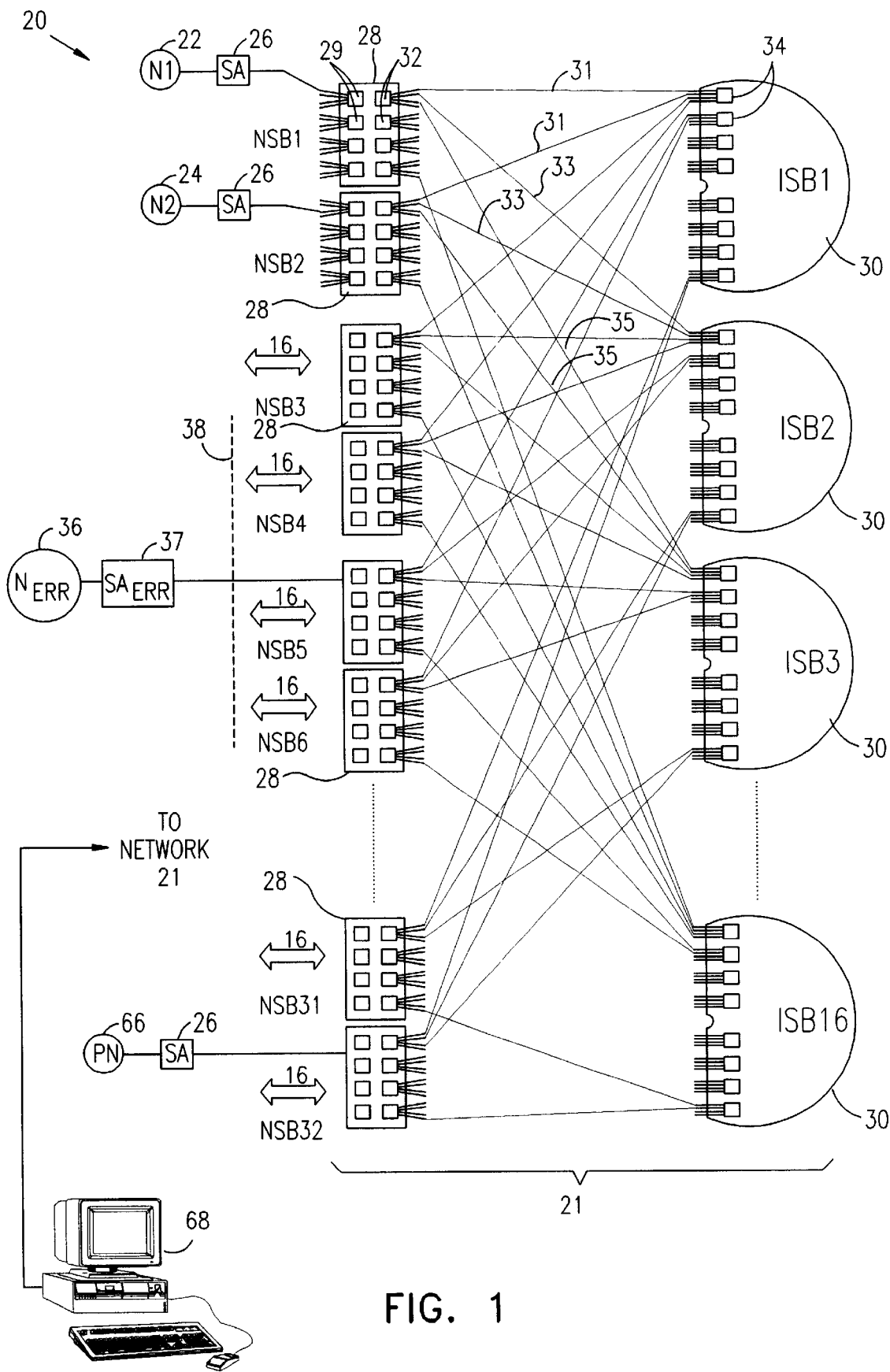
FIG. 1 is a schematic block diagram of a packet-switched data network including elements for performing automated testing and diagnostics, in accordance with a preferred embodiment of the present invention.

FIG. 1 is a schematic block diagram of a computer system 20, built around a manageable packet-switched network 21, in accordance with a preferred embodiment of the present invention. System 20 is based generally on the IBM RS/6000 SP computer system, described in the Background of the Invention. In the example shown in FIG. 1, the system comprises five hundred twelve nodes 22, 24, . . . , and three hundred eighty-four switches, including one hundred twenty-eight node switches 29 and two hundred fifty-six intermediate switches 32 and 34. The architecture of network 21 is described in greater detail hereinbelow, to aid in understanding the application of preferred embodiments of the present invention in testing network performance and diagnosing network faults. It will be understood, however, that the present invention is in no way limited to this particular context. Rather, the principles of the present invention are applicable to switched networks of various types and topologies, including (but not limited to) both multi-processor computer systems, such as system 20, and data communication networks. Such networks include, for example, switched Ethernet, Fast Ethernet, Token Ring, FDDI and ATM networks, as are known in the art.

In system 20, nodes 22, 24, . . . , generally comprise processors, which are assigned various tasks in the system. Alternatively, the nodes may comprise other elements, such as gateways (or routers) or input/output extensions, as are known in the art. Each node is connected to a port on one of node switches 32 by a switch adapter 26, which performs data link functions, as are known in the art. Generally speaking, each switch adapter routes data packets from the respective node to their destination through network 21, and receives data packets addressed to the node from the network.

A primary node 66 is assigned the functions of monitoring system 20 and managing the configuration of nodes and switches therein. It is capable of setting various parameters of the switches and the other nodes in the system, as well as resetting and initializing these elements, by sending them special "service packets," which contain service commands. The primary node monitors the system for errors and failures, by receiving error messages from the switches and other nodes, as well as by noting any elements that fail to respond and by collecting statistical measures of system performance. Preferably, system 20 also provides a user interface to an operator of the system via a terminal 68.

In some preferred embodiments of the present invention, one of the nodes, labeled $N_{ERR}$, is assigned to function as an error injector 36 for the purposes of diagnostics and testing. This function is described further hereinbelow.

Switches 29, 32 and 34 typically comprise custom, high-speed integrated circuit devices, preferably having eight ports each. Node switches 29 are arranged on thirty-two node switch boards 28, labeled NSB 1, NSB 2, . . . , NSB 32 in the figure. Intermediate switches 32 are similarly arranged on nodes switch boards 28, while intermediate switches 34 are arranged on sixteen intermediate switch boards 30, labeled ISB 1, ISB 2, . . . , ISB 16. Each of node switches 29 in the left-hand column of boards 28 (in the view shown in FIG. 1) is connected directly both to switch adapters 26 of four different nodes and to the four intermediate switches 32 in the right-hand column of the same board 28.

Based on the architecture shown in FIG. 1 (in which only a small subset of all the possible links in network 21 are illustrated), it will be observed that each node 22, 24, . . . , in system 20 can communicate with any other node over four different paths, or routes. Typically, switch adapters 26 are programmed so that successive data packets sent between any two of the nodes alternate in a "round robin" between the available paths, in order to level the loading of the different switches in the network. Thus, packets sent from node 22 (marked N1) to node 24 (N2) will pass in alternation via the uppermost switches on the intermediate switch boards 30 that are marked ISB 1, ISB 2 and ISB 3, along with ISB 4 (which is omitted in the figure, together with ISBs 5–15). Nodes 22 and 24 are linked via ISB 1, ISB 2 and ISB 3 over paths 31, 33 and 35 respectively. This sort of path alternation is well known in high-speed packet-switched networks.

Figure 2:
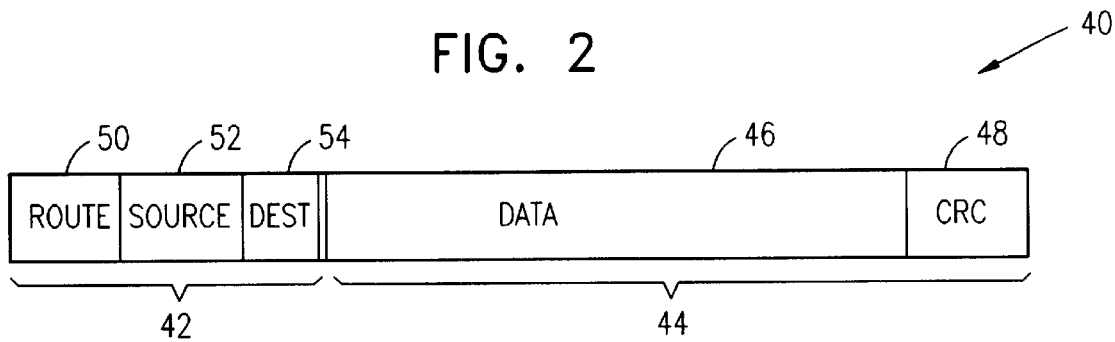
FIG. 2 is a block diagram that schematically illustrates a data packet transmitted in the network of FIG. 1.

FIG. 2 is a block diagram that schematically illustrates a data packet 40 transmitted in network 21, from node 22 to node 24, for example. This packet structure, which is generally known in the art, is presented here to aid in understanding the testing and diagnostic techniques described hereinbelow. A payload 44 includes data 46 provided by node 22, along with an error-correcting code 48, typically a CRC code, as is known in the art. Switch adapter 26 of node 22 adds on a header 42, which includes a route 50, a source address 52 and a destination address 54. Thus, in the example shown in FIG. 1 and described hereinabove, source address 52 will identify node 22 (N1); destination address 54 will identify node 24 (N2); and the route will alternate among paths 31, 33, 35, . . . . Optionally, the header contains other information, as well.

Preferably, switch adapter 26 selects the paths from a route table, which is pre-programmed based on the known configuration of network 21 and stored in a memory (not 10 shown) associated with the adapter. The table may be re-programmed from primary node 66. For any given node, the route table typically has the general form shown below in Table I. This table shows only a few of the 512 rows of the actual routing table, with pro forma table entries for purposes of illustration.

TABLE I

| Destination node | Route 1 | Route 2 | Route 3 | Route 4 |
|---|---|---|---|---|
| ... | ... | ... | ... | ... |
| 32 | 1, 1, 3, 1 | 1, 2, 3, 1 | 1, 3, 3, 1 | 1, 4, 3, 1 |
| 33 | 1, 1, 3, 2 | 1, 2, 3, 2 | 1, 3, 3, 2 | 1, 4, 3, 2 |
| 34 | 1, 1, 3, 3 | 1, 2, 3, 3 | 1, 3, 3, 3 | 1, 4, 3, 3 |
| ... | ... | ... | ... | ... |

The switch adapter maintains a modulo-4 count of packets that it sends, and selects the packet route successively according to the packet count.

On-line Switch Diagnostics

Figure 3:
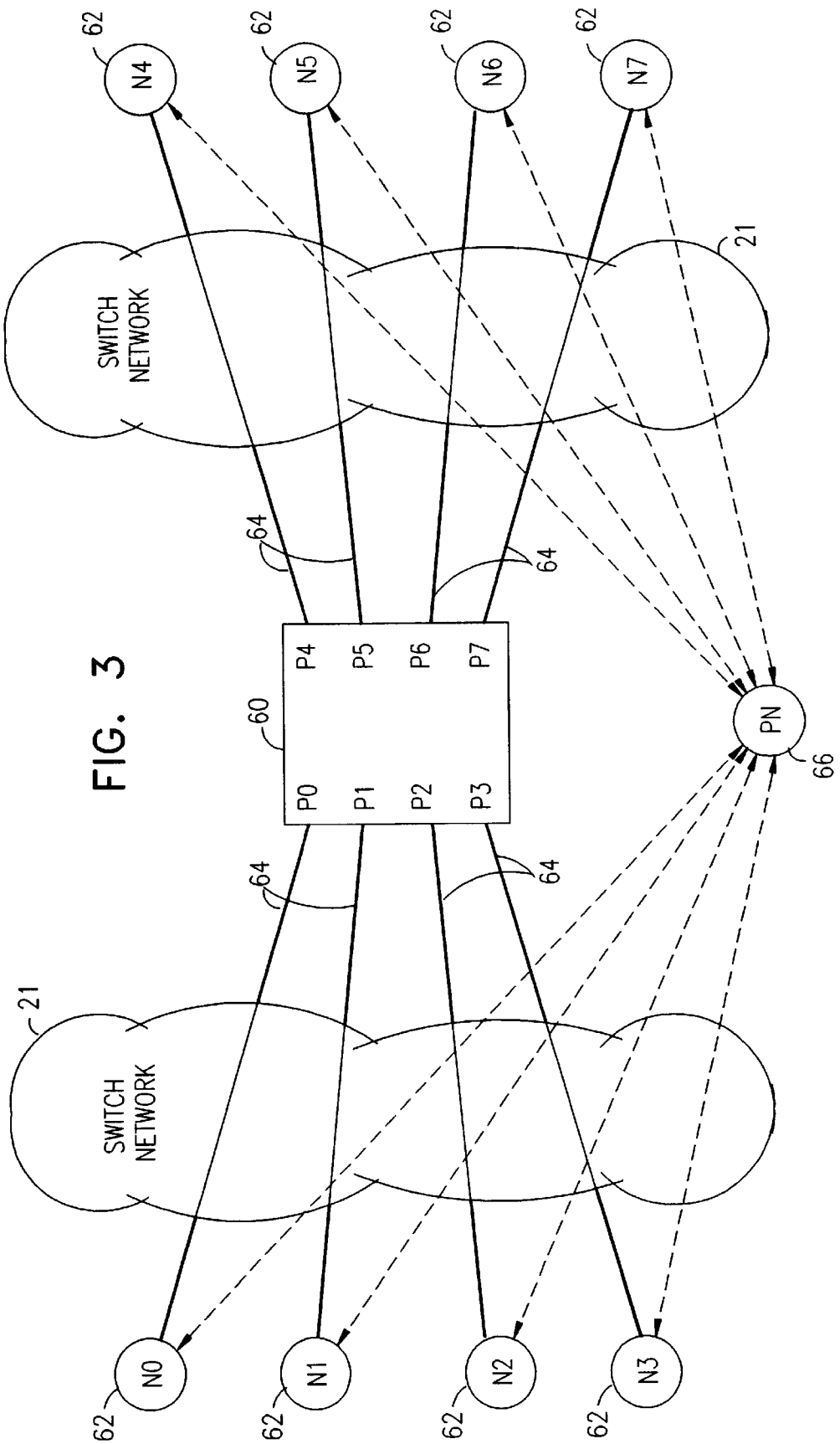
FIG. 3 is a schematic block diagram illustrating a detail of the network of FIG. 1, useful in understanding a method for diagnosis of a suspected faulty switch, in accordance with a preferred embodiment of the present invention.

FIG. 3 is a schematic, graphic illustration showing a detail of system 20, useful in understanding a method for diagnosis of a suspected faulty switch 60, in accordance with a preferred embodiment of the present invention. Switch 60 may comprise substantially any switch device in network 21, or alternatively, a switch in some other switched network. The process of diagnostic testing illustrated by FIG. 3 is managed by primary node 66. When the principles of this embodiment are applied in a network other than network 21, a node is preferably chosen to manage the testing and to collect and analyze the results.

Primary node 66 selects assistant nodes 62, labeled N0, N1, ..., N7, for the purposes of testing switch 60. Generally, the number of assistant nodes is equal to the number of ports on the switch, in this case eight ports, labeled P0, ..., P7, with one assistant node assigned to each port. Preferably, the assistant nodes selected are those having the shortest respective paths 64 through network 21 to each of the ports. When several nodes have the same path length to a given port (as will frequently be the case in network 21), considerations of computing convenience may be taken into account in selecting the assistant nodes. The assistant nodes are preferably chosen automatically by the primary node. Alternatively, they may be selected by an operator of system 20. Assistant nodes 62 are taken off-line by the primary node, i.e., they are isolated from participation in multiprocessor program flow and inter-processor communications in system 20, for the duration of the testing of switch 60. The remaining nodes and switches in system 20 continue to function normally, however.

The idea of testing switch 60 in this manner is that using any pair of assistant nodes 62, data packets can be sent at a known rate over predetermined paths 64 between the respective pair of switch ports. Data stress can thus be created on that pair of ports or on any combination of ports, including all of the ports, simultaneously. The stress level (i.e., the port data rate) is known and deterministic, in contrast to the variable-stress situations that occur in normal network operation. Therefore, there is a high likelihood that in the course of a systematic program of testing ports P0, P1, ..., P7 at different data rates and in different combinations, the specific stress conditions that cause failure of switch 60 will be found. In normal network operation, these same conditions arise only intermittently and unpredictably. Primary node 66 controls assistant nodes 62 and receives messages from the nodes, including particularly error messages, which it analyzes to detect failures of switch 60 when they occur. The entire diagnostic program for a given switch should take no more than a few minutes.

In order to test switch 60 in the most thorough, controlled and efficient manner possible, at full data rate, assistant nodes 62 must be made to transmit data only over respective paths 64. As described hereinabove, routing of packets between the nodes normally. alternates in a "round robin" among several alternative routes, as illustrated in Table I. Therefore, only one fourth of the packets transmitted from assistant node N0 to assistant node N4, for example, will pass through ports P0 and P4 of switch 60 as desired. To defeat the round robin and overcome this problem, the route table associated with each of the assistant nodes is preferably altered so that for each of the other assistant nodes, all packets are sent over the same route. Thus, the route table for assistant node N0 is preferably as shown schematically in Table II:

TABLE II

| Destination node | Route 1 | Route 2 | Route 3 | Route 4 |
|---|---|---|---|---|
| ... | ... | ... | ... | ... |
| N1 | ..., P0, P1, ... | ..., P0, P1, ... | ..., P0, P1, ... | ..., P0, P1, ... |
| N2 | ..., P0, P2, ... | ..., P0, P2, ... | ..., P0, P2, ... | ..., P0, P2, ... |
| N3 | ..., P0, P3, ... | ..., P0, P3, ... | ..., P0, P3, ... | ..., P0, P3, ... |
| ... | ... | ... | ... | ... |

In the IBM RS/6000 SP system described hereinabove, the primary node sends a service packet to the assistant nodes with the command: "DOWNLOAD ROUTES (Table)," as provided by management software used in the system. The argument of the command is the route table, as illustrated by Table II.

Figure 4:
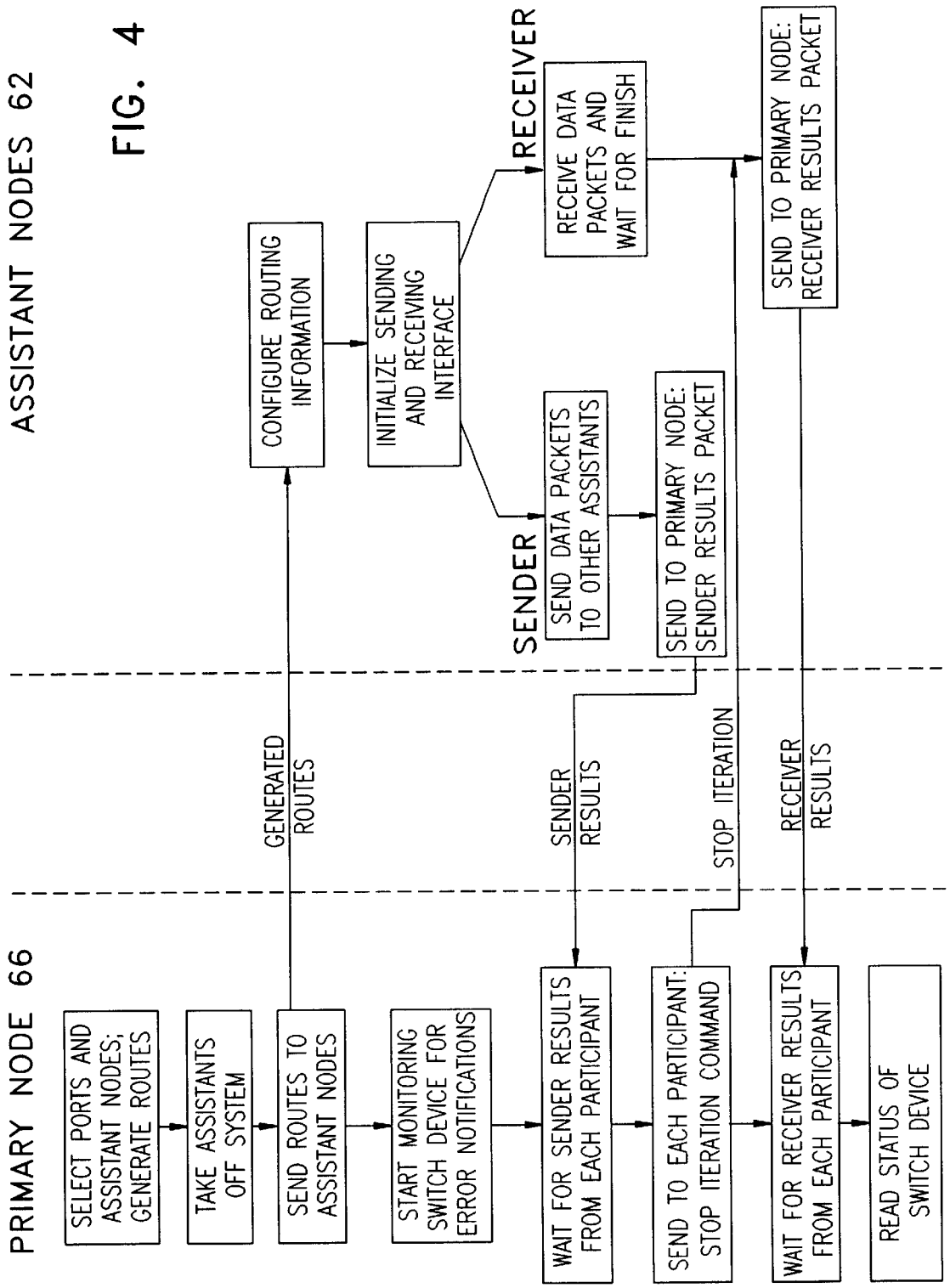
FIG. 4 is a flow chart that schematically illustrates a method for diagnosis of a suspected faulty switch, in accordance with a preferred embodiment of the present invention.

FIG. 4 is a flow chart that schematically illustrates a method for testing switch 60, in accordance with a preferred embodiment of the present invention. A user test command, to test a particular suspect switch, is directed to primary node 66. The primary node then decides which nodes to use as assistant nodes 62 and which routes are to connect the assistant nodes to the respective switch ports. For this purpose, the primary node preferably uses information regarding network connections taken from a device database, such as a database of this type maintained by a switch management daemon in the above-mentioned IBM RS/6000 SP system. A plan is then made for testing the ports of switch 60.

Typically, the testing plan includes three modes of stressing the switch:
  Sending heavy traffic through selected pairs of ports.
  Sending random traffic through all of the ports at once.
  Sending traffic given combinations of three or more ports.
Preferably, the first two modes are used first, since all possible port combinations in these modes can be covered in a relatively short time. If the switch failure is not induced in either of these two modes, the third (multi-port) mode is used.

Once the test plan has been determined, the primary node takes the assistant nodes off-line to begin the testing. Suitable route tables are preferably downloaded to each of the respective switch adapters, as described hereinabove. The assistant nodes configure their routing information accordingly, and initialize their send and receive interfaces for the switch testing.

Commands and information are preferably exchanged between the nodes and the switch or switches involved using service packets, which are typically characterized by a header and/or flags that distinguish them from ordinary data packets. For example, in the above-mentioned IBM RS/6000 SP system, "service command" service packets are used by primary node 66 to configure and read the status of the switch being tested. "Node command" service packets are sent to set up assistant nodes 62 for switch testing, as well as to return the nodes to normal operation after the testing is finished. Node command packets are also sent to the nodes in system 20 that are not participating in the testing, to instruct them that the assistant nodes are unavailable. The assistant nodes use any suitable, available data-communication interface for exchanging data packets through switch 60, preferably a low-level, low-reliability data communication protocol.

Testing then proceeds in iterations. In each iteration, the primary node selects and initializes appropriate assistant nodes and then instructs a certain assistant node or nodes (or all of the assistant nodes, in the second stress mode listed above) to begin sending data packets to one or more receiving nodes. Typically, each sending node is instructed to send a predetermined number of such packets. The remaining assistant nodes are instructed to be prepared to receive data. In some configurations, an assistant node can act as both a sender and a receiver. The receiving node or nodes for each sending node may be pre-selected, or they may be chosen by the sending node at random among the other assistant nodes. Preferably, the packets are of different, random lengths, and contain random data, although predetermined packet sizes and content may also be used. While the sending node or nodes are sending the packets, the primary node monitors switch 60 for error notifications that would indicate a switch failure under the given testing conditions.

When the sending node or nodes have finished sending all of the assigned packets, they return message packets to the primary node with their "sender results," indicating how many packets they have sent to each receiving node. The primary node sends a command to the receiving nodes to indicate that the iteration is finished. The receiving nodes stop receiving packets and return "receiver results" to the primary node, reporting the number of packets they have received from each sender. At the conclusion of the iteration, the primary node compares the sender and receiver results, and reads the status of switch 60, in order to determine whether any errors have occurred.

This process of choosing sending and receiving nodes to pass packets through selected ports of the switch, and receiving the results from the nodes, continues until the switch fault is found or until the diagnostic program is completed. Generally, the switch will be considered to be faulty if one or more of the following events occur in testing:

An unrecoverable error in the switch, for example, an error that would ordinarily require network management software running on the primary node to disable the switch or one of its ports, and reconfigure the network accordingly.

A proportional number of recoverable errors in the switch that exceeds a predetermined error rate.

A number of data packets lost (i.e., irretrievably corrupted) in excess of a predetermined threshold.

Although preferred embodiments are described hereinabove on the basis of a particular network configuration and certain specific combinations of diagnostic tests and features, it will be appreciated that the principles of the present invention may be applied in a wide range of different computer networks and systems. The various testing and diagnostic techniques described herein may be used singly or in combination with other techniques, such as those described in the above-mentioned U.S. patent applications entitled "Switch Adapter Testing" and "Error Injection Apparatus and Method." The capability of carrying out these techniques is preferably incorporated in firmware associated with a manageable switch network. Alternatively, software for carrying out such techniques may be supplied as a separate product for installation on the network, wherein the software code may be provided on tangible media, such as disks, or conveyed over a communications link.

It will thus be appreciated that the preferred embodiments described above are cited by way of example, and the full scope of the invention is limited only by the claims.

APPENDICES

The following appendices describe methods and tools useful in implementation of the preferred embodiments described hereinabove in the context of the above-mentioned IBM SP computer system.

Appendix A: Object-oriented Framework for Switch Diagnostics

Networks have become a key component of the corporate infrastructure. Managing the growing complexity of networks is a major challenge imposing the necessity for better management tools.

This section presents an object-oriented framework for dynamic extension of network management software that goes beyond basic capabilities. The framework provides a common management interface for implementing advanced network management applications on top of an existing basic management system. It also defines an object model for such applications and the implementation of associated common logic.

The framework presented here was used in the implementation of switch diagnostics, as described hereinabove—a set of tools for isolating the cause of faults in a switched network. These diagnostic tools were implemented for IBM's Scalable POWERParallel System (SP) on top of the existing Communication Subsystem (CSS) switch network management software.

1. Introduction

The size and complexity of corporate networks is growing fast. Modern networks consist of thousands of devices and multiple logical and physical layers. The availability of powerful management tools can be a critical factor in the success or failure of this new wave of networks.

Network Management includes fault management, configuration management, accounting, performance management, security management, and other areas. This document concentrates on the area of fault management: the process of locating and correcting network problems (faults). A lot of work has been done in order to facilitate building network management systems. Major management technologies include SNMP ([5]), OSI CMIP ([1], [2], [3]), CORBA ([8], [9]), DMTF DMI ([7]), JMAPI ([6]). (The bracketed numbers refer to references listed at the end of the appendix.)

Management technology specifications typically cover the communications protocols between manager and managed systems, and the information model. This includes the management information that defines requests for management operations, the results of the operations, and unsolicited reports such as alarms.

Some management technologies also define interfaces for implementing management applications within the management infrastructure according to its information model (JMAPI ([6]), DMI MI ([7])). These management interfaces define the interaction between the management application and the underlying management system. They allow the application to access management information, to invoke management operations, and to subscribe for unsolicited asynchronous events (e.g., error reports produced by network devices) to be delivered to the application by the system.

Using management interfaces has many advantages:

Independence of operating system and versions.

Consistent interface.

Compatibility with different revisions of management software.

Easy access to management information.

In a management system that exposes a well-defined management interface, management processing is no longer static, hard coded and resource-dependent; it becomes dynamically extensible to include new management services. In addition, it allows the developers of management applications to focus on their core expertise (a specific sub-domain of management) rather than spend time and energy studying the system and integrating their tools.

This appendix presents an object-oriented framework for implementing advanced network management. The framework's goal is to simplify the extension of the existing network management software which provides basic configuration, setup and fault recovery utilities. It provides a mechanism for dynamically extending the network management system by using "pluggable" components that use a common management interface.

Another way to simplify the development of management applications is to provide an object model that captures the applications' common logic. The framework presented in this appendix defines such an object model and provides its implementation. We chose to model a management application as a Finite State Machine (FSM). Finite State Machines provide a very effective way of describing and implementing the control logic for applications ([11]). They are commonly used to implement communication protocols, to control the interactions with a user, and so on. Finite State Machines are especially competent in areas of concurrent and real-time software, and in particular, network management. The framework handles an application's FSM state transitions, and, most importantly, it provides a per-state event subscription mechanism. Delivering asynchronous notifications to a subscribed application is a basic service provided in every network management solution. However, standard mechanisms for event subscription are not aware of the internal state of the application; registration is done per application. Our framework extends this mechanism by providing an additional subscription mechanism based on the current FSM state; different subscription information is defined for each FSM state. This mechanism makes the implementation straightforward, given a high-level definition of an FSM. It dramatically improves code quality and maintainability and greatly shortens the application development cycle.

The framework also provides a library of utility classes that can be used by all applications. These classes provide an abstraction layer between the network management system and the applications. They also improve code reuse and portability of applications.

The presented framework is implemented in IBM's Scalable POWERParallel System ([10]), on top of the existing Communication SubSystem (CSS) switch network management software. It has proven to be very useful in implementing SP switch network diagnostics—a set of tools for locating the cause of faults in an SP switch network, including tools that carry out the methods described hereinabove. These and other diagnostic applications have been developed using the framework. In addition, the general approach in definition, design and implementation of the framework allowed it to be used to implement an auxiliary testing tool.

The rest of this appendix is organized as follows:

Section 2 provides an overview of standard network management technologies.

Section 3 defines requirements for advanced management framework, and details a network management framework for an SP system.

Section 4 describes how SP switch diagnostics use the framework.

Finally, Section 5 summarizes the appendix.

2. Management Technologies

The major technologies for network management are OSI (Open System Interconnection) Management (based on CMIP), Internet Management (based on SNMP) and CORBA/OMG.

2.1 OSI Systems Management Overview

The OSI (CMIP) standards provide a efficient object-oriented management information model, support flexible distribution of management functionality, and provide common system management functions ([1], [2], [3]).

Figure 5:
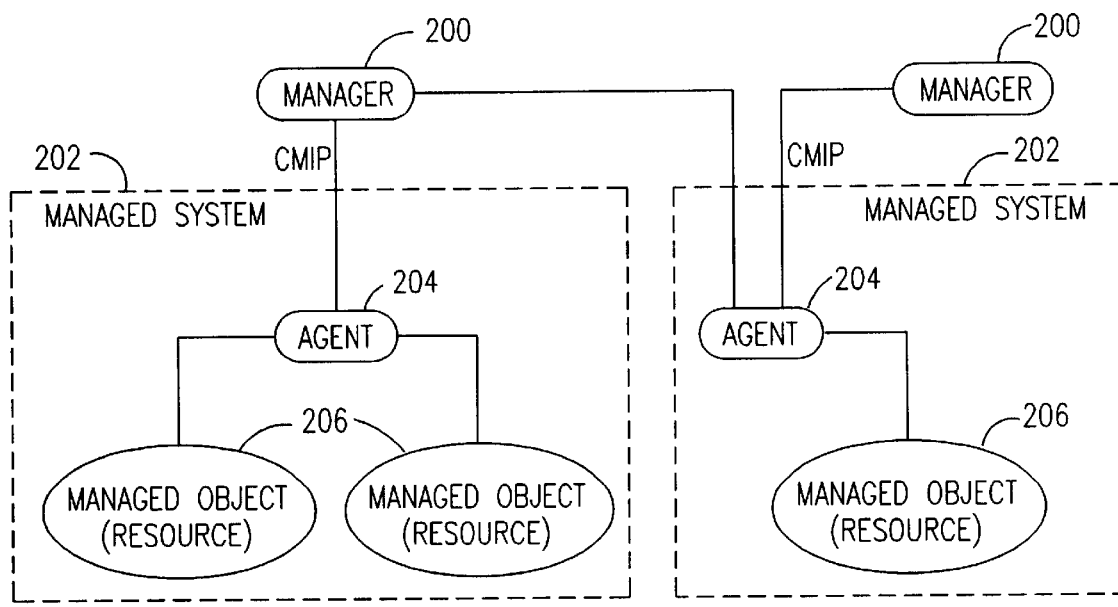
FIG. 5 is a schematic block diagram illustrating a network system management architecture, useful in implementing preferred embodiments of the present invention.

FIG. 5 is a schematic block diagram illustrating the OSI management architecture. The basic configuration has a manager system 200 that communicates with a managed system 202 in order to manage a resource 206 that is controlled by the managed system. The OSI architecture models these components as manager 200, agent 204, and managed object 206. The OSI management specifications cover the interface between manager and the agent. The main goal of the architecture is to define how to manage resources of all kinds. The standards have been divided into two areas:

Communications standards specify how manager and agent systems communicate with one another, using an OSI protocol stack and the CMIP application layer protocol. This includes specifying how to organize requests for operations on resources and reports on their activity, and how to transfer these requests and reports between open systems.

Management information standards are concerned with specifying how particular kinds of resources can be managed over a communications interface. This includes specifying which operations managers can perform on the resources and what unsolicited information are sent to managers when events occur. This kind of definition for a particular type of resource is referred to as a managed object definition.

The concept of managed objects has been adopted more widely than just in OSI. Managed objects have come to be regarded as a general technique for defining the management capability of a resource, applicable to OSI environments, Internet ([4]), CORBA, and so on.

2.2 Internet Management

The IETF has specified a number of RFCs that define how network management should work in the TCP/IP environment. Its basic protocol is SNMP (Simple Network Management Protocol) ([5]).

The Internet Management model adopts a manager/agent approach, where the agents maintain information about resources and managers request information from the agents.

The Internet Structure of Management Information (SMI) standard specifies a methodology for defining the management information contained in the Management Information Base (MIB).

SNMP was designed to solve the communication problems between different types of networks, and it quickly became the network management protocol of choice for IP networks. Various developer kits are available for implementing SNMP managers; almost all major vendors of internetwork hardware, such as bridges and routers, design their products to support SNMP. However, non-IP devices, such as switches in our target environment, lack this support.

2.3 CORBA

The Object Management Group (OMG) has developed an object-based environment for the development of distributed systems. This environment includes CORBA (the Common Object Request Broker) and IDL (an Interface Definition Language) which are used to specify the interface to objects. The ORB communication protocol is General Inter-ORB Protocol (GIOP) defined by the OMG; it is designed to work over different transport protocols. The Internet Inter-ORB Protocol (IIOP) is defined for TCP/IP transport.

CORBA is not a technology dedicated to network management. Rather, it is a distributed systems technology that can be used to specify objects that are related to the area of network management. CORBA also includes management-related services such as Naming and Event services.

3. Object-Oriented Framework for Advanced Network Management

3.1 Management Frameworks

This section discusses the implementation of management applications and their integration within management infrastructures that provide basic configuration, setup, and fault management services. The objective of this discussion is to define the requirements for a framework that will allow a management system to be easily extended and simplify the deployment of extension applications to existing customer systems. Some management technologies explicitly define interfaces for implementing management applications within the infrastructure. Others do not define them, but rather leave the issue of providing management APIs to system implementers. Accordingly, the ability to extend a management product and to seamlessly integrate third-party applications within it varies greatly for different network management systems.

Common issues that have to be resolved when developing any management application are:

1. Integrating the application within the infrastructure—Integration should be as seamless as possible. The system should be unaware of application specifics; the application dependency on the system version should be minimized.

2. Access to management information—An application should have access to management information, including configuration information, real-time event notification, and so forth. The application should also be able to perform management functions, such as modifying the configuration or using services provided by the system.

3. Remote invocation—In many cases, locally available management information is not sufficient for an application's needs. In these cases, the application will need a mechanism for invocation on remote machines.

4. Interaction with user—Different components of a distributed management application may need to interact with users. A distributed input/output mechanism is therefore needed.

5. Communication mechanism—Components of an application need to communicate. A reliable communication protocol should be implemented if the underlying communication mechanism is not reliable.

6. Implementing asynchronous reactive behavior—An application typically must react to asynchronous events, such as error notifications from network devices. Therefore, it needs a methodology for representing and implementing this reactive behavior. In addition, the behavior on different types of servers may vary. A clean method of combining different behaviors within the same code is consequently needed. Providing common answers to these issues would shorten the application development cycle and time-to-market, thus giving management application developers the ability to be competitive and meet aggressive schedules. The remainder of this section describes the architecture and framework that give such answers for extending SP switch network management software.

3.2 Architecture

Figure 6:
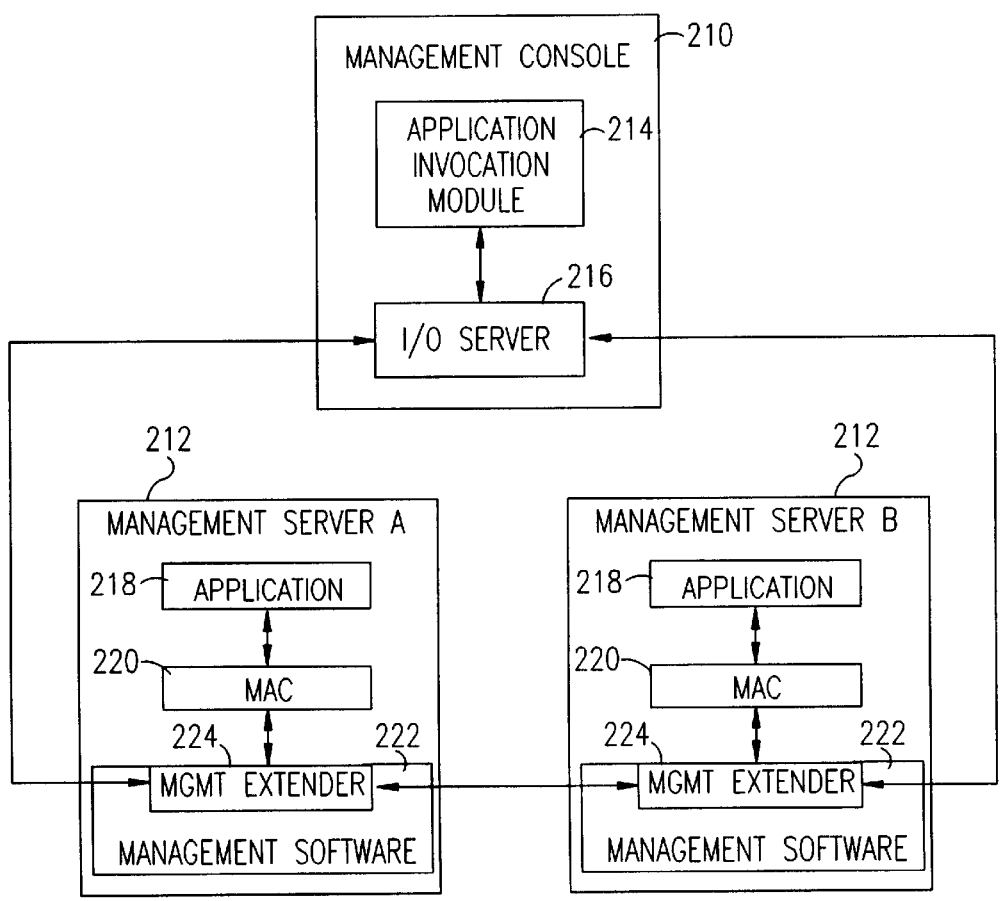
FIG. 6 is a schematic block diagram illustrating an object-oriented framework for advanced network management, in accordance with a preferred embodiment of the present invention.

FIG. 6 is a schematic block diagram illustrating an object-oriented framework for advanced network management, in accordance with a preferred embodiment of the present invention. It is assumed that the underlying management software is running on multiple nodes called management servers 212. An additional node called a management console 210 is used to run the management GUI. The architecture consists of components running on both of these types of nodes, as shown in the figure.

An I/O Server 216 is responsible for interaction with users, including invocation of an application 214 by the user. It is used as a proxy for exchanging relevant information between the user and the management software. The I/O Server communicates with Management Extender components.

A Management Extender 224 is a small component that provides support for extending the management servers. It runs as part of basic management software 222 and is responsible for the dynamic loading and unloading of applications 218 and the forwarding of events to these applications. The Management Extender interacts with a Management Abstraction Component (MAC) 220 and provides it with access to the underlying management software.

The Management Abstraction Component is a class library that provides an abstraction layer between the management software and the applications. It also defines an object model for event-driven applications, as discussed below in Section 3.3.

The rest of this section details the responsibilities of each component and their interactions.

3.2.1 Management Extender

The Management Extender component runs as part of a management server. It listens to arriving events, identifies and processes special events sent to the Extender, and forwards other events to the MAC.

The Management Extender exposes the definition of several special events that are used for application invocation and termination. Other components (running on the management console or servers) can send these events to the Extender, in order to perform remote invocation or shutdown of an application.

The Extender keeps track of any applications it invokes. When no applications are running, it ignores all events (except its own). When applications are running, the Extender forwards these events to the MAC, where they are dispatched or delivered to applications if necessary.

3.2.2 I/O Server

The I/O Server component runs on the management console and interacts in a unified manner with the Application Invocation Module provided by each application. The Application Invocation Module receives input parameters from the user and passes them to the I/O Server. The I/O Server sends an application invocation event to the Extender that is running on the default server. Similarly, the I/O Server provides an interface for aborting applications.

While an application is running, the I/O Server can display application messages on the Management Console, and send user responses back to the application using special events.

3.2.3 Management Abstraction Component (MAC)

The MAC is a class library that provides an abstraction layer between the management software and the applications. It interacts with the Extender to access management information and basic services.

The MAC provides the applications with the following different types of services:

1. Implementation of management classes that encapsulate management information and services, thus abstracting them from the system's internal details. For example, it can provide a class representing a network adapter and provide methods for the adapter's configuration.
2. Exposing interfaces for exchanging messages with the user.
3. Provision of an interface for exchanging messages with the other application components that run on additional servers. It implements a reliable communication protocol on top of an existing unreliable communication protocol provided by the underlying software. The interface is provided both for the reliable protocol and for the native unreliable one.
4. Implementation of utility classes that abstract applications from the operating system. Examples include classes such as Thread, Mutex, and File that represent OS resources; Timer that provides a timeout mechanism; logging facilities class, etc.
5. Implementation of a common logic of event-driven applications, as defined by the object model described in the next section.

3.3 Object Model for Event-driven Applications

The common management services provided by the framework are described above. The next step in designing the framework is to define a methodology for implementing event-driven applications. The framework defines an object model that represents asynchronous behavior and implements the common logic.

An application is modeled as a Finite State Machine (FSM), in which input events are:

Events produced by the management system.

Events produced by the framework (e.g., events generated by the I/O Server, from user input).

Messages exchanged by the application components.

The FSM object model defines classes that represent: generic FSM, FSM state, FSM input event, and FSM state transition. The framework implements these generic objects. An application derives its own objects from these classes and thus reuses both design and implementation.

The framework handles FSM state transitions and provides the event subscription mechanism based on the current FSM state (i.e., different subscription information is defined for each FSM state). The framework handles all issues regarding event dispatching and guarantees that unexpected events will not be delivered.

Figure 7:
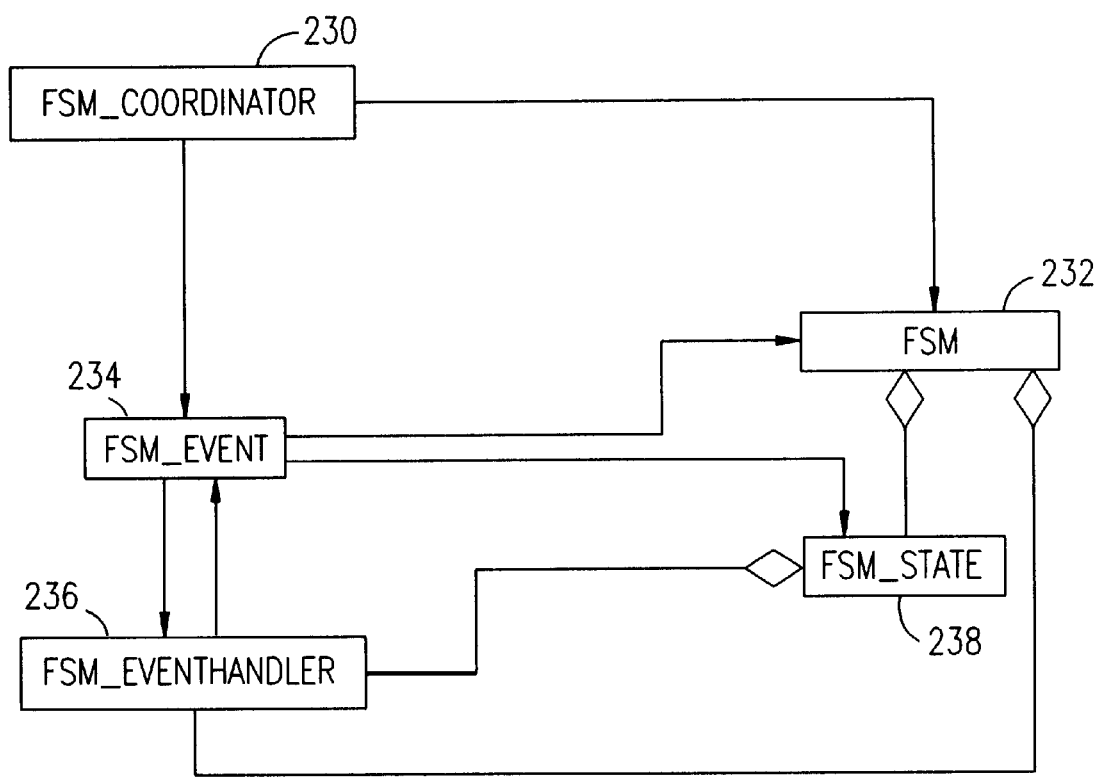
FIG. 7 is a schematic block diagram illustrating a finite state machine object model used in network diagnostics, in accordance with a preferred embodiment of the present invention.

FIG. 7 is a schematic block diagram that illustrates the main objects or classes defined in the FSM object model and the relationship between these classes, in accordance with a preferred embodiment of the present invention. The class descriptions are as follows:

FSM_Coordinator 230

This class is a "handle" to an application FSM. It supports the dynamic creation of FSMs and handles interactions with infrastructure by subscribing to relevant events, creating event objects for received events and forwarding the event objects to FSMs.

FSM 232

This class represents a Finite State Machine (FSM) and:

Provides an interface for registering FSM states and for subscription of common events (i.e., events that should be handled in the same manner in each state).

Is responsible for maintaining the current state and for state transitions.

Implements the dispatching of the events.

To do this, it looks for an appropriate event handler in the FSM event subscription information and in the subscription information of the current FSM State. It then invokes the handler (if found) or discards the event if neither the FSM nor the current state are subscribed to this event.

Users employ this class to derive their own classes representing application-specific behavior. This behavior may depend on the server's role (i.e., it may be different for different components of the same distributed application).

FSM_State 238

This class represents the state of a Finite State Machine. The FSM_State object provides an interface for subscription to state-specific events. It is used for registration of proper handlers for events which have to be processed in this state. Users derive their own states from this class and register these states in appropriate FSM objects.

FSM_Event 234

This class represents events in the framework. FSM_Event data includes the real event information and a unique ID that is used for event subscription.

FSM_EventHandler 236

This class represents the FSM state transition and defines an abstract method for event processing. All user defined handlers are derived from this class; they provide the implementation of the event processing. Application-specific FSM and state objects register relevant event handlers to be invoked by the framework.

The above classes allow applications to be implemented in a very simple manner. Given a high-level definition of an application-specific FSM, a corresponding class is derived from FSM class. For each state a corresponding class is derived from FSM_State and for each transition a corresponding class is derived from FSM_EventHandler. The FSM-derived object creates and registers its states at initialization time; each state creates and registers its event handlers at its initialization time. Each handler provides implementation for the abstract event processing method defined in the parent class FSM_EventHandler. This method implements an FSM transition; it returns the identifier of the next FSM state.

Figure 8:
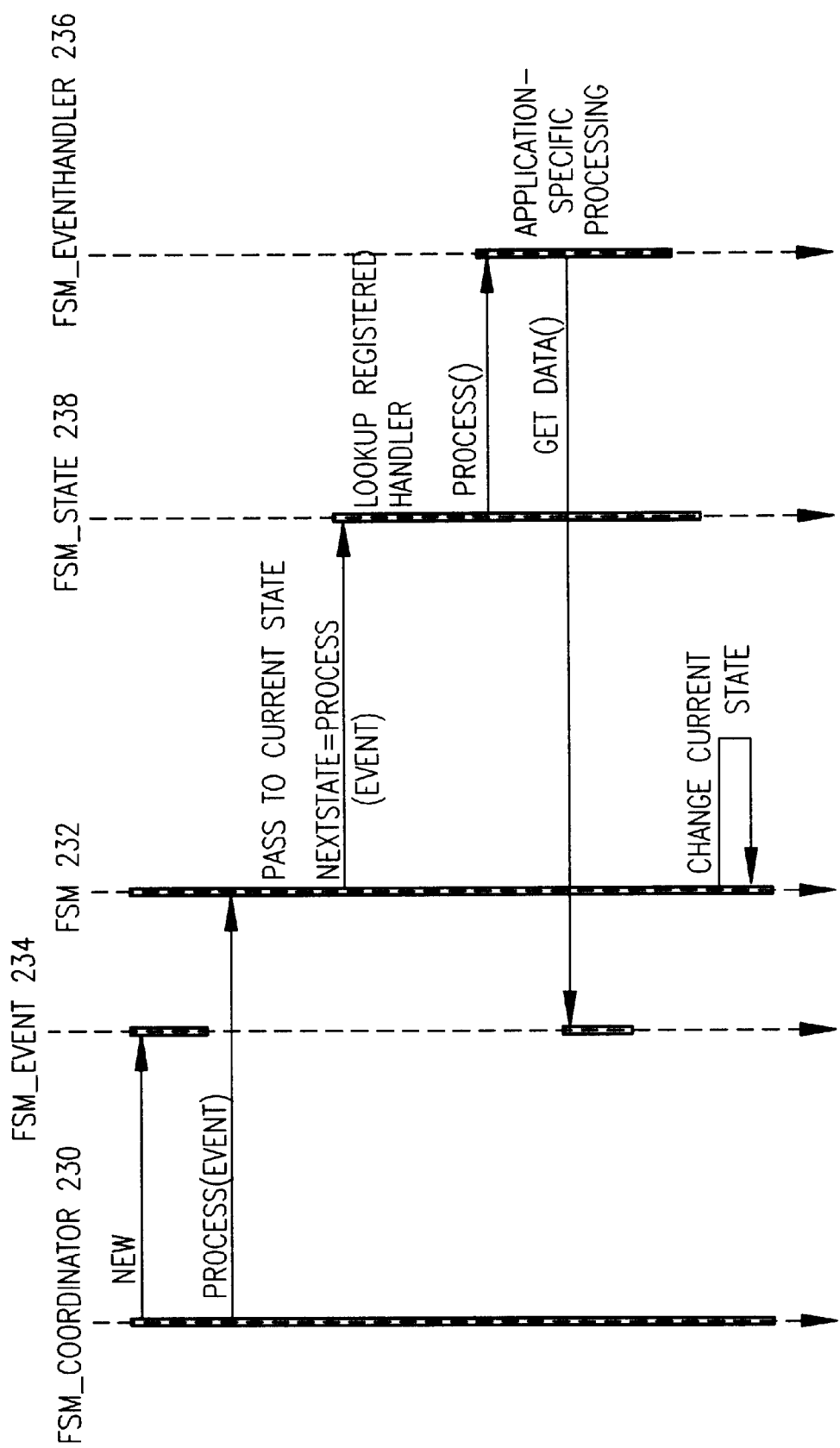
FIG. 8 is a schematic diagram illustrating interaction of the objects in the model of FIG. 7.

FIG. 8 is a schematic diagram that illustrates how FSM objects interact in order to process an event, in accordance with a preferred embodiment of the present invention. Once the application has defined its states and handlers according to the above object model, it is no longer concerned with maintaining state and deciding how to process an event. It need not examine various state flags to determine appropriate behavior, and to filter out irrelevant or unexpected events. This makes the implementation much more robust and maintainable. In addition, it is easy to verify that the application behavior matches the high-level design.

3.4 Implementation Details

In this section, we describe several points of the framework implementation. The target platform for the implementation was the IBM SP, running AIX operating system, version 4.3. The implementation was done in C++ language using the IBM xlC C++ compiler.

3.4.1 Dynamic Invocation Implementation

The framework implements dynamic application invocation using an AIX mechanism for dynamic loading of shared libraries. Applications are implemented as AIX shared libraries and provide a common interface used by the framework for application initialization. The Management Extender invokes an application upon receiving a special event. This event contains essential information about the application, including the path to the application library and application parameters. When such an event is received, the Extender loads the specified library, obtains a pointer to its entry point, and calls it.

The entry point is a function implemented by the MAC. Each application is statically linked with the MAC and specifies this function as its library entry point in link settings. The entry point is used to perform necessary initialization of the MAC and the application, and to resolve interface functions used by the Extender to forward events to the MAC.

The MAC initializes the application by calling a pre-defined initialization function. Since it is used to create an application-specific FSM object, each application must implement this function, which is later used by the MAC.

3.4.2 Reliable Communication Protocol

The protocol used for network management by the SP switch network management software is unreliable. That is, there is no FIFO and no guarantee for delivery of the management packets. The framework we developed implements a reliable protocol over the native unreliable protocol. An application can use our protocol when it is necessary to guarantee an ordered delivery of the management packets, or can use the native unreliable protocol if no guarantee is required.

In order to support the reliability of the communication protocol, we used the following techniques:

Storage of buffers on the source server with a time-out.

Retransmission and acknowledgments for successful packet delivery.

Suppression of the duplicate packets in case of multiple sends.

Every packet that is sent between two servers carries a sequence number that is maintained independently between any two peer servers. These sequence numbers allow the packets to be delivered to the application in the same order in which they were transmitted by the sender, even if they were received out-of-order because they were sent over different routes. When a receiver delivers a packet to the application, it sends an acknowledgment for the received packet sequence number. If after a pre-defined timeout, the sender does not receive acknowledgment, it retransmits the retained copy of the lost packet (or discards it after pre-defined number of retries and reports an error to the application). If the receiver receives several packets with the same sequence number, it delivers the first one to the application and discards the rest. However, the receiver will send an acknowledgment for every copy of a delivered packet.

The reliable protocol of management packet transmission provides a duplicate- and loss-free FIFO channel between any two servers. It has proven to be a very effective feature greatly facilitating the design and implementation of management applications.

4. Switch Diagnostics

The framework described in the previous section was used to develop SP Switch Diagnostics—a set of tools used to isolate the cause of faults in SP switch networks, including the diagnostic functions described hereinabove.

SP Switch Management Software provides a basic mechanism for fault recovery. It receives error notification events and performs necessary changes in the network configuration and device setup. This allows the network to remain operational, but does not provide a complete solution for fault isolation. In many cases the same error report may be caused by a fault that occurred in different devices. For example, errors that were detected on a link may be caused by faults in devices on both sides of the link, or by a bad cable in this link. The basic mechanism of reacting to error reports would simply disable the link when the error threshold is exceeded or a critical fault occurs. An additional mechanism is needed to identify the faulty component, so that it can be replaced, and the network can continue to achieve maximum performance. SP Switch Diagnostics tools solve this and additional network management problems. The tools were implemented using the framework discussed in this appendix and using the FSM object model.

The rest of the section describes implementation of one of these tools and gives a simplified overview of its FSM-based design. The tool is called Switch Stress Test, and its purpose is to check an intermittently failing switch, as described hereinabove with reference to FIGS. 3 and 4. The underlying management software provides different information on the primary and assistant nodes involved in the test. For example, an application instance running on the primary server receives error notifications from switch devices, while an application instance running on the assistant server receives error notifications only from the local network adapter. Accordingly, the application behavior is completely different on each type of node. These behaviors are represented by two different classes derived from FSM class 232, as described hereinbelow with reference to FIG. 10.

Figure 9:
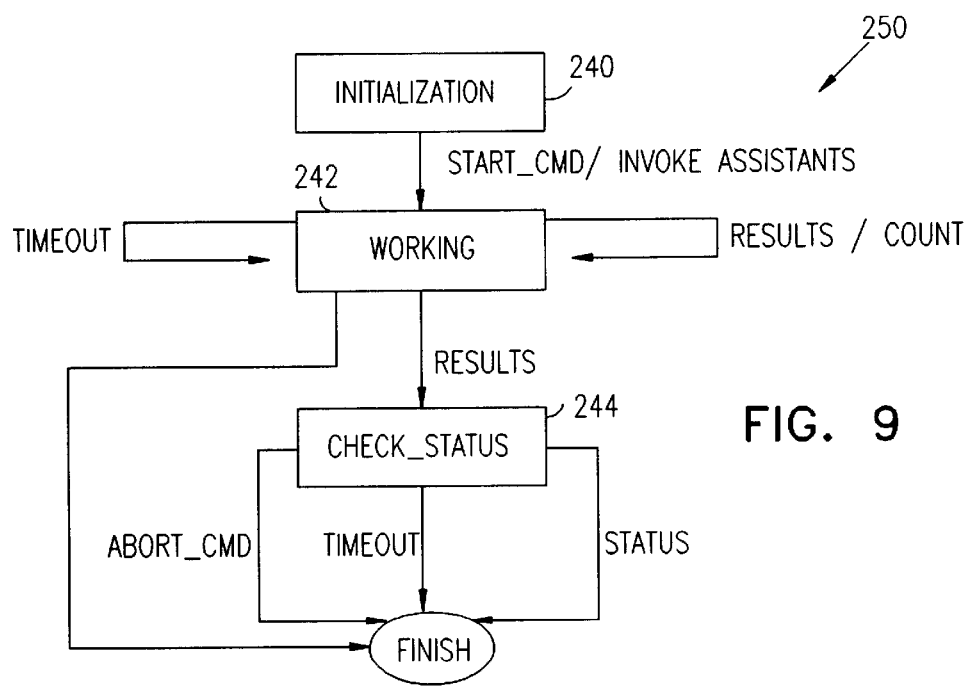
FIG. 9 is a flow chart that schematically illustrates an application of a finite state machine in network diagnostics, in accordance with a preferred embodiment of the present invention.

FIG. 9 is a flow chart that schematically illustrates a high-level model of a primary node FSM 250, in accordance with a preferred embodiment of the present invention. It has three states: the first is an initial state 240 with a single transition to a Working state 242, triggered by the START command. During this transition, the test instance invokes additional assistant instances on other nodes and sends to them a remote invocation event.

The Working state is used to wait for the results of sending/receiving data from each assistant. The primary remains in this state until all results are received, unless an assistant times out or the user aborts the test. When all results are received, the primary passes to the last Check_ Status state 244. In this transition, it asks the switch device to send its status; it stays in the last state until the status arrives or a timeout occurs. Note that events such as TIMEOUT are treated differently depending on the application state, resulting in different diagnoses.

Figure 10:
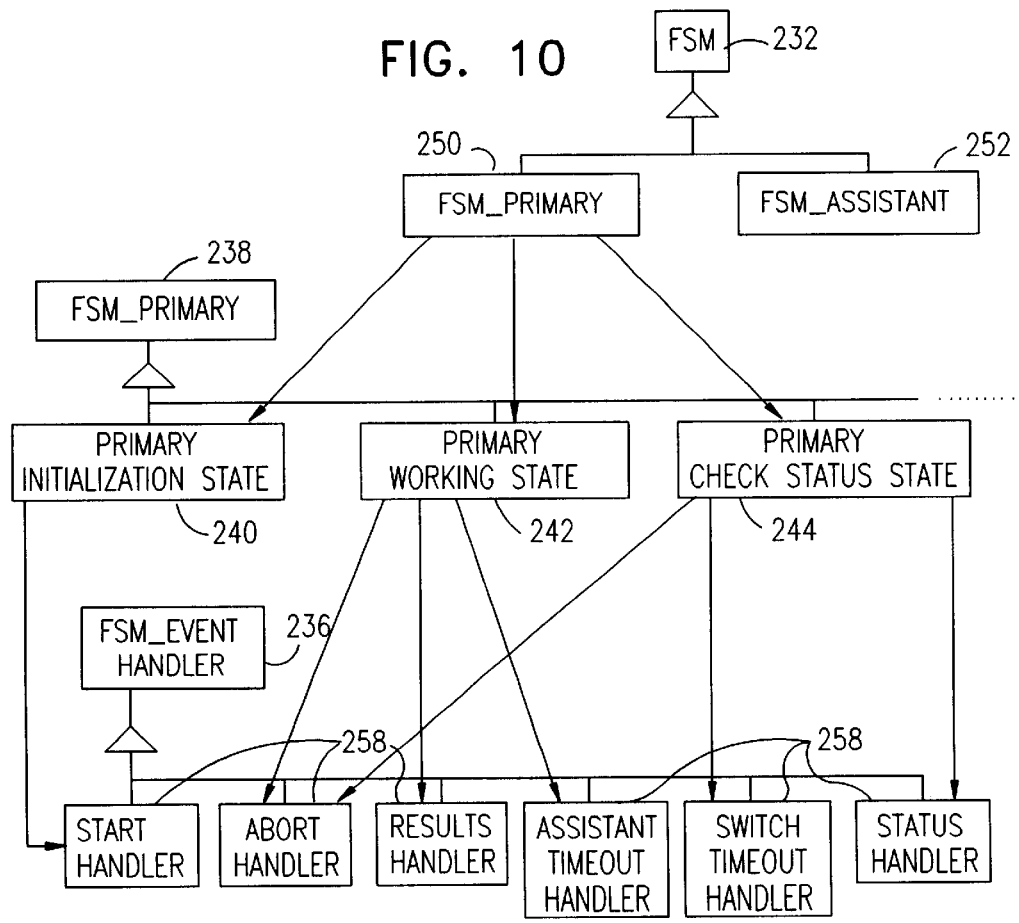
FIG. 10 is a schematic block diagram illustrating low-level design of the diagnostic application of FIG. 9.

FIG. 10 is a schematic block diagram illustrating low-level design of the application of FIG. 9, in accordance with a preferred embodiment of the present invention. The figure shows only the design of FSM_Primary 250, but those skilled in the art will be able to construct the design of the assistant node state machine, FSM_Assistant 252, in a straightforward manner. For each FSM, FSM state, and FSM transition, proper classes are derived from the base classes provided by the framework. These base classes are used to register state objects in the FSM objects and to register transition objects in state objects. Separate handlers 258 are defined for the same events that are treated differently in different states. The application just needs to "set up" the FSM at initialization time, and to implement the actions to be taken during each state transition. The framework maintains the defined states, the current state, and the registered handlers. This makes the verification of the application's behavior very simple, and facilitates the implementation, the debugging and the maintenance of the application.

5. Summary

We presented an object-oriented framework for the dynamic extension of network management software. This framework resolves common issues that were listed in Section 3.1, including:

Provides applications with the ability to be seamlessly integrated within a management infrastructure through a dynamic invocation mechanism.

Provides applications with a unified interface to management software through MAC management classes.

Provides a remote invocation mechanism through the I/O Server and Management Extender.

Provides a user interaction mechanism through the I/O Server.

Implements a reliable packet delivery protocol within the MAC.

Defines and implements an object model for event-driven applications.

The framework is used to implement several SP switch diagnostic tools. The general approach used in the design and implementation of the framework also allow it to be used to develop auxiliary testing tools that were not originally defined. These testing tools provide functionality which is completely different from the diagnostic tools, namely, the implementation of error injection, simulation and/or stimulation of different network errors, and allowing the testing of diagnostic tools, management software and any distributed applications that use the network.

6. References

[1] Systems Management Overview, ISO/IEC 10040 (X.701).

[2] Management Framework for OSI, ISO/IEC 7498-4 (X.700).

[3] Common Management Information Protocol (CMIP), ISO/IEC 9596.

[4] The Common Management Information Services and Protocols for the Internet (CMOT and CMIP), RFC 1189.

[5] A Simple Network Management Protocol (SNMP), RFC 1157.

[6] Java Management API (JMAPI), http://java.sun.com/products/JavaManagement

[7] DMI 2.0s Specification, http://www.dmtf.org/spec/spec.html

[8] CORBA/IIOP 2.2, http://www.omg.org/library/specindx.html

[9] CORBAservices, http://www.omg.org/library/specindx.html

[10] The RS/6000 SP High-Performance Communication Network, http://www.rs6000.ibm.com/resource/technology/sp_sw1/spswp1.book_1.html.

[11] UML Finite State Machine Diagrams, Robert C. Martin, Engineering Notebook Column, C++ Report, June, 1998.

Appendix B: Client-server Switch Network Diagnostics Architecture and Framework

1. Introduction

This appendix describes further aspects of methodology, architecture and a framework for developing diagnostics tests and diagnostics tools for the manageable switch network. It outlines a client-server model for the diagnostics architecture and its framework in the switch network, which allows easy creation of diagnostics tests that are able to access every resource of the network. The tests, which are incorporated in the switch management software, run concurrently with user applications without any disturbance to the user applications and to network management software. In this architecture, the server comprises switch management software that exports diagnostics interfaces to the clients, and the clients are different diagnostics tests.

2. Key Idea

Switch diagnostics are tests that will give service personnel the ability to troubleshoot switch problems during both normal operation of switch network (non-destructive tests) and during times when the switch network is not running customer applications (destructive tests). Technical personnel are able to run these tests from a Control Workstation (CWS) when they suspect that a component in the switch network is not performing properly. Switch diagnostics point to the failing component and make a decision as to whether this is a "real" hardware problem.

The following two issues summarizes the challenges in developing a new SP diagnostic test:

1. Developing a well-defined model of the failures to be detected.

2. Defining the test capabilities (what kind of failures will be detected).

2.1. Properties of the Model

The model described hereinbelow is based on five properties: Coverage, Sensitivity, Operability, Performance and Scalability (referred to hereinafter as CSOPS). The following table depicts a simple definition for each of the five properties:

| | |
|---|---|
| Coverage | What failures the test would detect? |
| Sensitivity | Possibility of false alarms? Or undetected failures? |
| Operability | When and how the test would run? |
| Performance | For how long the test would run? |
| Scalability | Is the test scalable on large systems? |

Overall, these properties provide a model for defining old and new tests, and become a measure of their effectiveness.

1) Coverage

We use Coverage to define what failures the test should detect. The Coverage property of a test is defined using a model of the failures that are the target of this test. Such a model can be:

Deterministic failure of a single path through a switch chip, or

Heavy traffic through each path of a switch chip, or

All combinations of two overloaded paths through a switch chip.

This and other models can be defined, specifying what the particular test can detect.

The issue of whether the failure is deterministic or non-deterministic is also of relevance to the model. In the case of deterministic failure, Coverage will usually be specified in terms of the failure, or its cause. An example of this type of Coverage is: "the deterministic failure of an interposer or a cable."

However, in many cases, non-deterministic failures are the target of diagnostics tests, such as intermittent failures. In these cases, it is difficult to define the failure or its cause. In this case, the model will be defined in terms of the activity that is being stimulated. An example of this type of Coverage is: "bombarding the switch with heavy traffic." Another example would be a test that exercises specific data patterns to stimulate failures, for instance, the failures of a interposer.

In both cases of failures (deterministic and non-deterministic), the target of the Coverage property is to provide a lucid definition of what the test can do. After reporting a problem, the given set of diagnostics is required to identify what test to use. The association of a reported problem with a test is left to the expert who is using the test. The Coverage property serves as the basis for this association.

2) Sensitivity

Some of the failures detected by the diagnostics, are non-deterministic. This present a dilemma for the developer of the test. The test can be written in such a way that it runs until a failure is detected, but using such a test may be impractical, as it could run forever.

As a result, we can assume that some tests, although having the potential of detecting a failure, may fail to stimulate the particular failure and therefore not detect it. The target of the Sensitivity property is to specify the probability of a test missing a failure.

In the case of a deterministic failure, it is good engineering practice to have a test that presents full sensitivity to the failure. For example, a failure caused by a disconnected cable is deterministic, so that the test that detects it should also be deterministic.

The Sensitivity property of the diagnostic, is used to characterize another probable difficulty. A test may report a failure in its absence, for example the problem of bad CRC. A packet passing through an adapter may have a bad CRC. This is a normal situation, unless the frequency of the bad packets is higher than an allowable threshold. It is possible that due to a stressful test, that threshold might be reached.

We will use the following terminology when defining the Sensitivity property of a test:

False-positive: There is no failure, but the test reported a failure.

False-negative: There is a failure, but the test missed it.

3) Operability

The Operability properties of a diagnostics test encompass several characteristics, all related to the limitations of the test:

Destructive: During the execution of a destructive test, applications that are using switch network cannot be run. A destructive test can change the routing information of the nodes.

User intervention: Define user intervention during the execution of the test, like insertion of a wrap plug.

System constraints: Limitation in running the test, such as limited memory, or specific system topology.

When Bring-up, Maintenance, Installation, or Normal operation.

4) Performance

The Performance property of a diagnostic identifies the time it takes to run the test. This is an important factor for a test that stresses the system, or tests that iterate through data patterns. Some tests may take a long time to run, or their time of execution can be defined by the user.

5) Scalability

In the development of a diagnostic test for a parallel system, it is important to have tests which are scalable. A target of all tests will be to have a complexity no more than linear in N (number of nodes). The Scalability property describes this relationship.

Another area of complexity in diagnostics tests is that they are computer programs, part of the system management software. The constraints on running these programs is an important consideration, as they may have to be executed in presence of system failures.

2.2. Existing Approaches

Today there are three main approaches known in the art to write switch network diagnostics tests:

1. Writing different script that perform some kind of automation of system administration methods.
2. Writing stand-alone user space programs that run on top of the operating system but separately from the switch management software.
3. Writing programs that performs diagnostics but are non-compatible with switch management software.

Although these approaches may be used to implement the testing and diagnostic methods of the present invention, they have serious disadvantages:

1. Scripts are system administrators' home-made utilities, which mostly perform some automation of trivial testing (like pinging some nodes in order to test the nodes' connectivity). These scripts can test some very simple deterministic situations (such as a node that consistently does not respond to the ping), but are useless for more sophisticated testing. Also, system administrators usually do not have real knowledge about underlying hardware at a sufficient level in order to create more clever scripts.
2. User space programs designed to diagnose switch-related problems suffer from the fact that they cannot access privileged resources, such as adapters, switches, reported errors, etc. They are not able to create sufficient testing of the hardware or analyze the results of testing, since they have no integration or interfaces with switch management software that was created for such diagnostics purposes.
3. Diagnostics programs that are non-compatible with switch management software cannot run concurrently with applications. One extreme example of such diagnostics program is how advanced diagnostics implemented in most Windows NT boxes: user have to exit Windows NT and reboot the machine to DOS, and from there run the advanced diagnostics test suite.

A client-server model for diagnostics architecture in a switch network, as described herein, allows easy creation of diagnostics tests that are able to access every resource of the network, are able to run concurrently with the user applications, and can be incorporated in the switch management software.

2.3. SP Switch Diagnostics Architecture

SP diagnostics system (SPD) architecture is designed to meet several requirements:

1. Tests must fit into the system management architecture.
2. Tests must not disturb (or prevent) the system management software from doing its primary job.
3. Tests must abstract system management software from its details, by providing common interface. The system management software should be unaware of test specifics.

4. Test musts be loaded dynamically only when the user wants to run them, and be unloaded immediately after they are done, leaving the system in exactly same state as before test was started.

5. Performance, reliability, serviceability and availability features of the system management software must be unchanged when diagnostics are not invoked.

Figure 11:
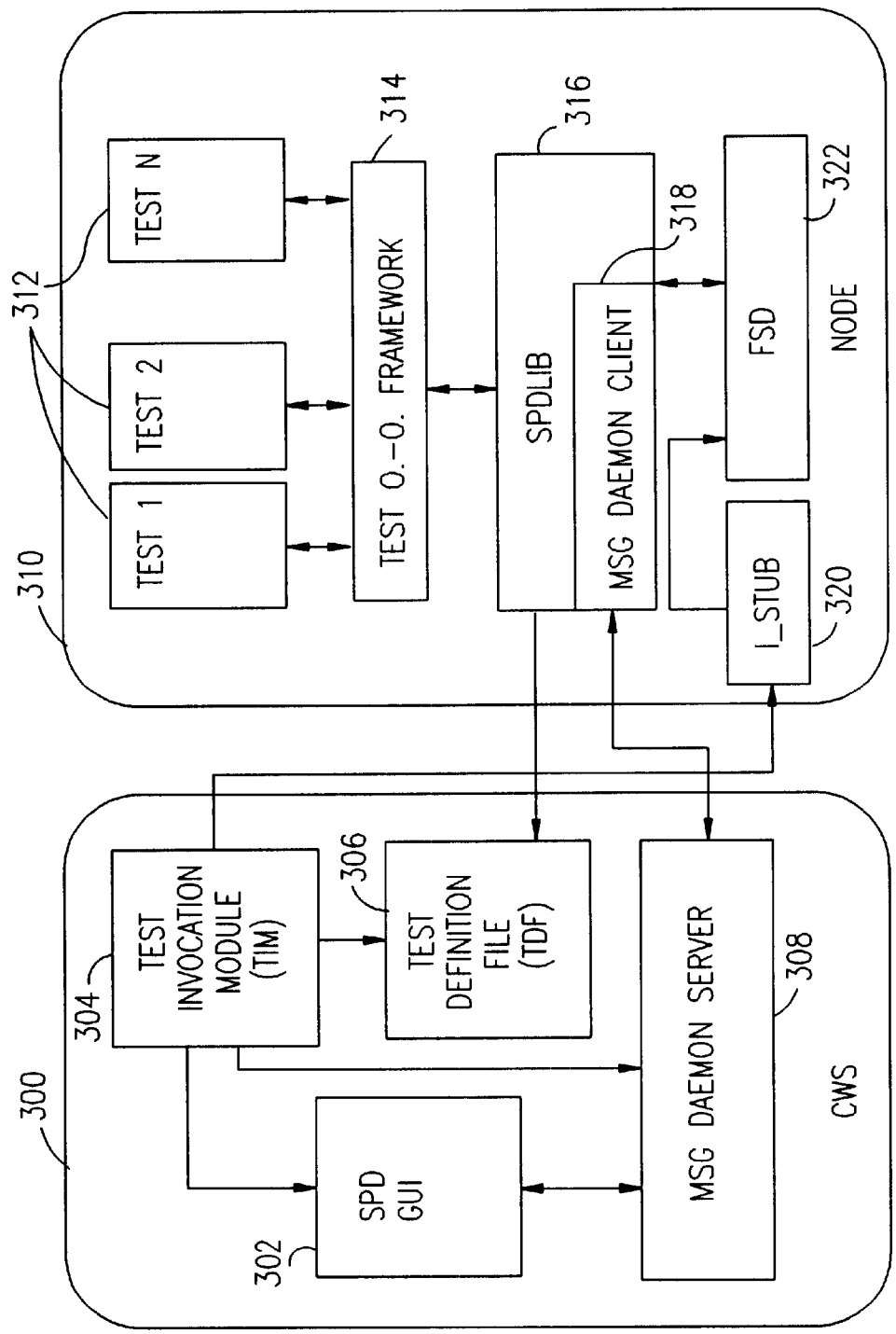
FIG. 11 is a schematic block diagram illustrating a client-server network diagnostic architecture, in accordance with a preferred embodiment of the present invention.

FIG. 11 is a schematic block diagram that illustrates the SPD architecture, in accordance with a preferred embodiment of the present invention. The architecture includes two different parts: SPD layers that run on a CWS 300, and SPD layers that run on every node 310.

When the user invokes a test on the CWS, a Test Invocation Module (TIM) 304 creates a Test Definition File (TDF) 306, initializes a SPD Message Daemon Server 308 and invokes a SPD GUI program 302. After this whole environment was created on the CWS, the TIM remotely invokes an i_stub program 320 on the primary node. This program generates a diagnostics request to the system management module, called a fault-service daemon (FSD) 322.

FSD is an event-driven program that idles most of the time waiting for received events, such as error packets from any network component. When FSD receives a diagnostics request, it changes its run mode to the diagnostics mode. In this mode, all received events are first handled by the diagnostics models, and only after that might be forwarded to the FSD for further processing. First, FSD loads a dynamically-loadable library SPDLib 316. When SPDLib is loaded, FSD resolves all hook functions for diagnostic processing. There are several such functions that are called only when diagnostics are running.

The main responsibility of the SPDLib is to provide a general interface between tests and the FSD, abstract the FSD logic from the test logic, and to provide a common, general mechanism for communication with the user on the CWS. When SPDLib is loaded and properly initialized, it loads a test 312 that is to be performed. Every test is implemented as a dynamically-loadable library, which is statically linked with a Test Object-Oriented Framework 314. From the TDF file on the CWS, SPDLib receives all necessary information about the test —where on the node the test resides, what is the test name, what are the port numbers of receive and transmit sockets of the SPD Message Daemon Server, etc.

SPDLib loads the test library and resolves all test interface functions. Every test includes several modules that provide different coverage of the problem. The SPD Test Object-Oriented Framework, which lays the basis for the tests, provides a general design and implementation framework. The tests have many things in common in their logic, including: the way tests are handled in the initialization stage, the way tests are terminated, the way different models of tests are loaded and unloaded, the way request messages and service packets are handled and processed, the way the communication protocols are used (initialization of the protocols and use of protocol services), and more.

The SPD object-oriented framework architecture provides a common framework that addresses all of these issues, providing a high degree of code reuse. The SPD framework has two aspects: the first is the framework itself, which provides all design and implementation patterns for the tests; and the second is helper utilities, which create a general interface to common resources, such as adapter use, protocol use, AIX resources use, etc.

2.4. Class Descriptions

Figure 12:
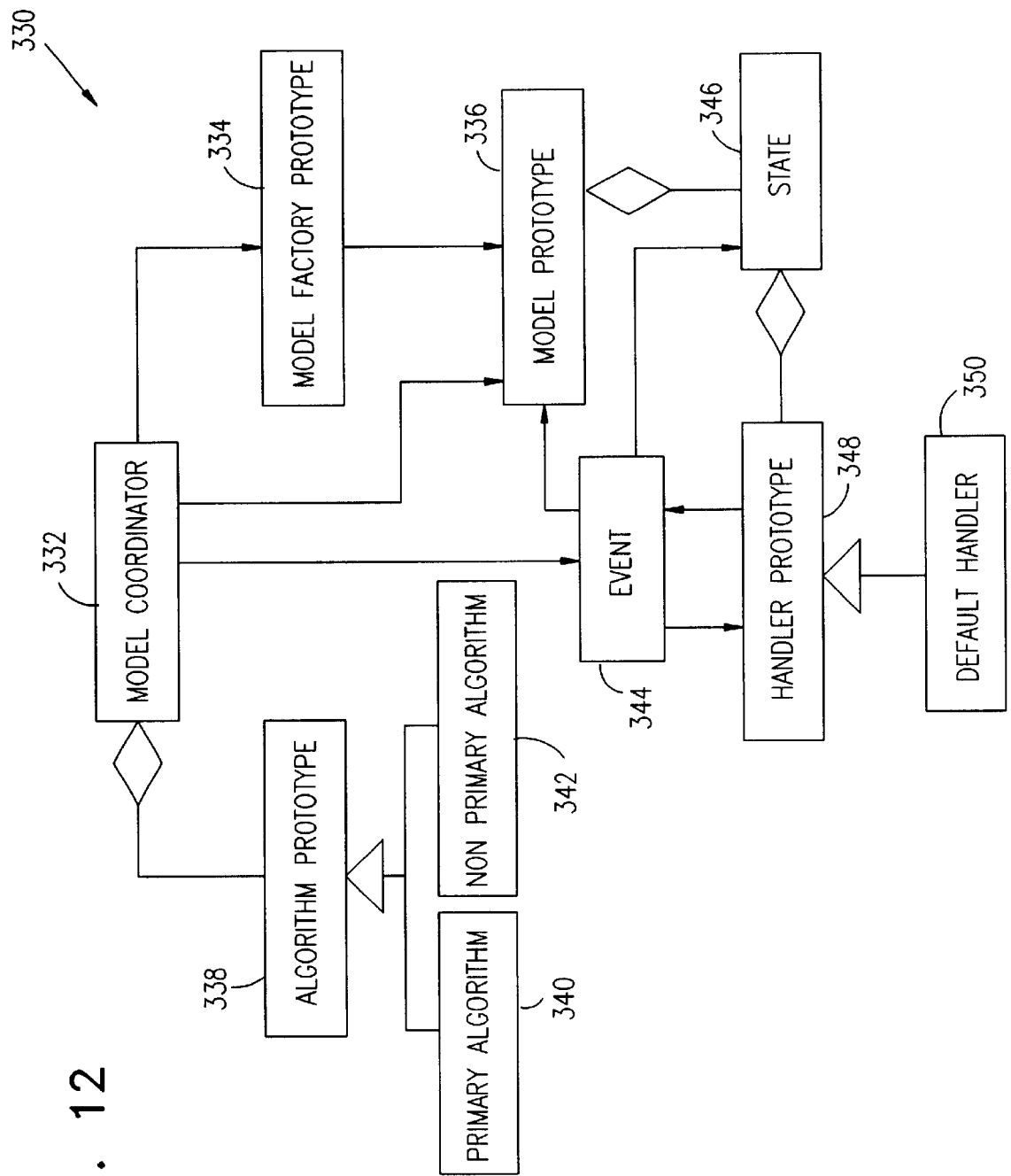
FIG. 12 is a schematic block diagram illustrating a hierarchy of classes used in the architecture of FIG. 11, in accordance with a preferred embodiment of the present invention.

FIG. 12 is a schematic block diagram illustrating a hierarchy of classes used in the SPD architecture, in accordance with a preferred embodiment of the present invention. The classes shown in the figure are described hereinbelow:

Class ModelCoordinator 332

This class is an orchestrator of all SPD frameworks. It decides which models to run and when, handles interactions with SPD, including registering callbacks and providing handler functions. It creates Event objects from received packets or requests and invokes Event processing. It also supplies an interface for model/test termination.

Class AlgorithmPrototype 338

This class provide a general interface to an algorithm by which the model on the node is initialized or terminated. On every node type this algorithm is different, and this class hides specifics of the algorithm.

Two derived classes—PrimaryAlgorithm 340 and Non-PrimaryAlgorithm 342 implement their logic in the proper way.

Class Model Prototype 336

This class represents model Finite State Machine (FSM), is responsible for state transitions, and holds state objects of the FSM states. Users derive their own classes from this class, representing different models of behavior on different types of nodes.

Class ModelFactoryPrototype 334

This class provides an interface for creating and enumerating test models. Its derived class holds knowledge of existing test-specific models.

Class State 346

This class represents the state of a Finite State Machine of the test model. The State object is used for registration of proper handlers for events that have to be processed in this state. The user might either derive his own states from this class, or use the provided class for State implementation.

Class Event 344

This class implements events in the framework and can process itself. Users can define callback data and store data in the event object, but, it is up to user to delete the callback data when necessary. (It is recommended that user detach the callback data from the event object prior to its deletion).

Event knows its type, subtype and kind, and requires EventToHandlerMap to retrieve the appropriate handler to process itself. The user cannot destroy Event. Rather, Event will take care of its deletion by itself, depending on how many references to it are still pending (i.e., how many instances of the event are in process).

Class HandlerPrototype 348

HandlerProtoype class is an abstract class that defines all necessary methods for event processing. All user-defined handlers should be derived from this class. Return code from the handler processing will be eventually returned to the SPDlib in order to decide what further actions should be taken according to this return code.

Class DefaultHandler 350: public HandlerPrototype

Class is used when the user did not provide any handler for event processing. The user can override this default processing.

In order to write a test, the test developer must define the test Finite State Machine, as well as events that are of interest to the test in every state, and must implement the handlers for these events. All other work is handled by the framework, minimizing the design, implementation and testing times of every test.

3. Principles of Operation

The user issues a request to run diagnostics on the CWS. The Test Invocation Module (TIM) parses the command line arguments and creates the Test Definition File (TDF). This file contains, in addition to test-specific parameters, several diagnostic sub-system common parameters, including the test to be invoked, the path to the loadable library to go with the test, models of the test to be run (optional), maximum time that the user allows test to run, nodes that are allowed or forbidden for the test to use, etc.

After the TIM invokes the Message Daemon Server and GUI program, and invokes the i_stub interface program on the primary node, it puts a diagnostics request into the Fault-Service Daemon (FSD) message queue.

When the FSD picks up this message from the queue, it realizes that this message was originated by the diagnostics subsystem (because of the message type) and loads the SPDLib. The SPDLib serves as an abstraction layer between the FSD and the Diagnostics Framework. It has a number of responsibilities, among them: to provide common interface to tests, and to provide a reliable communication protocol between nodes that participate in diagnostics activity.

After it is loaded, the SPDLib first resolves all hooks that exist in the FSD and are not active when there is no diagnostics activity. Every message, request or packet (all of which are termed events) received by the FSD will first be processed by these hook functions of the SPDLib. When the SPDLib finds that the particular test should continue with the processing, it forwards the event to the test processor.

Next, the SPDLib reads the TDF file and determines on this basis which library to load and via what path, and then loads this library. Each test library is made up of two parts: the statically-linked Test Object-Oriented Framework (T.O.O.F.), and test-specific logic on top of this Framework.

The T.O.O.F. creates a uniform environment for tests, depending on which node the test is running. The test environments of different nodes are different. For example, the primary node orchestrates all diagnostics activity, while non-primary nodes act as slaves.

The ModelCoordinator class of the T.O.O.F. is the class that actually orchestrates all test activity. First it decides which test models will run and in what fashion. For this purpose, it queries ModelFactoryPrototype (which is an abstract, user-implemented class) as to which models are available in the test and the estimated execution time for each model. With this information and data from the TDF in hand, the ModelCoordinator generates a list of models that are going to be executed and in what order. It then loads first test model from the list, executes it, unloads when the model is done, loads the next model, and so forth.

The test itself is implemented as a Finite State Machine (FSM). There are number of events in every state that are of interest for the test, and the test has different handlers for these events. When an event happens, the ModelCoordinator invokes the proper handler for the current state, in order to process this event.

Because the T.O.O.F. is used, the test developer need only decide what FSM to use for any particular test, which events are of interest for the FSM, and how to handle these events. The test developer is thus free to concentrate only on test-specific logic.

The switch diagnostics architecture described hereinabove allows the development of proactive diagnostics. Proactive diagnostics are diagnostic tests that run concurrently with user applications during underutilized system times, and test different hardware components during these times. The purpose of these proactive tests is to find out whether the tested hardware degrades in its operation, and to warn user about possible failures prior to the failure itself.

One of the facts that facilitates development of proactive diagnostics on top of the SP Switch Diagnostics Architecture is that this architecture does not disturb in any way the work of the management software layers and runs concurrently with them in the same process space, giving the diagnostics the ability to access any privileged resource. Because all modules are implemented as shared loadable libraries, they are loaded only when a node is to perform proactive diagnostic testing, and are immediately unloaded after the testing is done.

Diagnostic tests that are written in the present framework are preferably evaluated using an error injector, as described hereinabove.

What is claimed is:

1. In a computer network system that includes a multiplicity of nodes interconnected by a network of switches, each switch having multiple ports, a method for testing one of the switches, comprising:
    assigning a respective one of the nodes to each of a plurality of the ports of the switch being tested;
    configuring the network so that the switch being tested is substantially isolated from data flow from and to the nodes in the network that are not assigned to the ports of the switch;
    conveying data at a controlled rate between two or more of the assigned nodes through the respective ports; and
    observing behavior of the switch in response to the data being conveyed.

2. A method according to claim 1, wherein assigning the respective one of the nodes comprises selecting a node that is connected to the respective port by a short path through the network relative to other nodes in the system.

3. A method according to claim 1, wherein configuring the network comprises taking the switch being tested and the nodes assigned to the ports thereof off-line, while normal data transmission continues among other nodes and switches in the system.

4. A method according to claim 1, wherein conveying the data comprises transmitting data from at least one of the assigned nodes to at least one other of the assigned nodes through the corresponding ports at a substantially maximal transmission rate that the transmitting node can achieve.

5. A method according to claim 1, wherein conveying the data comprises conveying data through a selected pair of the ports of the switch being tested.

6. A method according to claim 1, wherein conveying the data comprises conveying data through substantially all of the ports of the switch being tested.

7. A method according to claim 1, wherein conveying the data comprises conveying data packets.

8. A method according to claim 7, wherein observing the behavior of the switch comprises comparing a number of data packets sent by at least one of the assigned nodes, to the number of packets received by one or more other assigned nodes and noting a discrepancy between the numbers.

9. A method according to claim 7, wherein in normal operation of the system, the data packets are routed between any pair of the nodes over a plurality of different routes in alternation, and wherein conveying the data comprises routing substantially all of the packets conveyed from a first one of the assigned nodes to a second one of the assigned nodes over one assigned route through the switch being tested.

10. A method according to claim 9, wherein the nodes are linked to the network by respective data link adapters, each of which routes data from the respective node through the network in accordance with a routing table stored in a memory thereof, and wherein routing substantially all of the packets comprises downloading to the adapter of the first one of the assigned nodes a test routing table containing the assigned route.

11. In a computer network system that includes a multiplicity of nodes interconnected by a network of switches, wherein the nodes are linked to the network by respective data link adapters, each of which is arranged to route data packets from a corresponding one of the nodes through the network to a given destination node over a plurality of different routes in alternation, a method for testing of the system, comprising:

selecting at least one of the data link adapters;

programming the selected data link adapter so that substantially all of the data packets sent from the corresponding node to the given destination node are routed in repetition over a single route;

conveying data from the corresponding node to the destination node over the single route; and observing operation of the system responsive to the conveyed data so as to identify a fault in the system.

12. A method according to claim 11, wherein the selected data link adapter routes the data packets in accordance with a routing table stored in a memory, and wherein programming the selected data link adapter comprises downloading a test routing table to the memory, responsive to which the data packets are routed in repetition over the single route.

13. A method according to claim 12, wherein the routing table normally contains multiple entries corresponding to the given destination node, each entry indicating one of the plurality of different routes, from among which entries the switch adapter in normal operation chooses the routes in alternation, and wherein downloading the test routing table comprises downloading a table including a plurality of identical entries corresponding to the given destination node.

14. In a computer network system that includes a multiplicity of nodes interconnected by a network of switches, wherein the nodes are linked to the network by respective data link adapters, each of which routes data from the respective node through the network in accordance with a normal routing table stored in a memory, a method for testing of the system, comprising:

selecting at least one of the data link adapters;

downloading to the selected data link adapter a respective test routing table, which differs substantially from the normal routing table thereof;

conveying data from the selected data link adapter through the network in accordance with the test routing table; and observing operation of the system responsive to the conveyed data so as to identify a fault therein.

15. A manageable computer network system, comprising:

a network of switches, each switch having multiple ports; and a multiplicity of nodes interconnected by the switches, wherein the nodes include a management node, which carries out a diagnostic test of a selected one of the switches by assigning a respective one of the nodes to each of a plurality of the ports of the selected switch, and by configuring the network so that the selected switch is substantially isolated from data flow from and to the remaining nodes in the network that are not assigned to the ports of the switch, and which issues a command to one or more of the nodes assigned to the ports to perform the test by conveying data at a controlled rate to another one or more of the assigned nodes through the respective ports, and receives information from the nodes in response to the test in order to detect a fault of the selected switch.

16. A system according to claim 15, wherein the management node is arranged to assign the respective one of the nodes by selecting a node that is connected to the respective port by a short path through the network relative to other nodes in the system.

17. A system according to claim 15, wherein the test is performed by transmitting data from at least one of the assigned nodes to at least one other of the assigned nodes through the corresponding ports at a substantially maximal transmission rate that the transmitting node can achieve.

18. A system according to claim 15, wherein the test is performed by conveying data through a selected pair of the ports of the switch being tested.

19. A system according to claim 15, wherein the test is performed by conveying data through substantially all of the ports of the switch being tested.

20. A system according to claim 15, wherein the management node takes the selected switch and the nodes assigned to the ports thereof off-line, while data transmission unconnected with the test continues among other nodes and switches in the system.

21. A system according to claim 15, wherein the network comprises a packet-switched network.

22. A system according to claim 21, wherein in order to detect the fault, a number of data packets sent by at least one of the assigned nodes is compared to the number of packets received by one or more other assigned nodes, and a discrepancy between the numbers is noted.

23. A system according to claim 21, wherein the switches are arranged so that the data packets may be routed between any pair of the nodes over a plurality of different routes in alternation, and wherein the test is performed by routing substantially all of the packets conveyed from a first one of the assigned nodes to a second one of the assigned nodes over one assigned route through the switch being tested.

24. A system according to claim 23, wherein the nodes are linked to the network by respective data link adapters, each of which routes data from the respective node through the network in accordance with a routing table stored in a memory thereof, and wherein to perform the test, a test routing table containing the assigned route is downloaded to the adapter of the first one of the assigned nodes.

25. A manageable computer network system, comprising:

a multiplicity of nodes;

a network of switches, each switch having multiple ports; and a multiplicity of data link adapters, each linking a respective one of the nodes to one of the ports of one of the switches, each of which adapters is arranged to route data packets from the respective node through the network to a given destination node over a plurality of different routes in alternation, wherein in a test mode of the system, at least one of the data link adapters is selected and programmed so that substantially all of the data packets sent from the corresponding node to the given destination node are routed in repetition over a single route, so that operation of the system can be observed while data are conveyed over the single route in order to identify a fault in the system.

26. A system according to claim 25, wherein the selected data link adapter comprises a memory and routes the data packets in accordance with a routing table stored in the memory, and wherein a test routing table is downloaded to the selected adapter, responsive to which the data packets are routed in repetition over the single route.

27. A system according to claim 26, wherein the routing table normally contains multiple entries corresponding to the given destination node, each entry indicating one of the plurality of different routes, and from among which entries the switch adapter in normal operation chooses the routes in alternation, and wherein the test routing table includes a plurality of identical entries corresponding to the given destination node.

28. A computer software product for testing a selected one of a plurality of switches, each switch having multiple ports, in a computer network system including a multiplicity of processor nodes coupled to the switches, one of which nodes is designated a primary node, the product comprising computer-readable code, which is read by the primary node, causing the primary node to assign a respective one of the nodes to each of a plurality of the ports of the selected switch, to configure the network so that the switch being tested is substantially isolated from data flow from and to the remaining nodes in the network that are not assigned to the ports of the switch, to cause data to be conveyed at a controlled rate between two or more of the assigned nodes through the respective ports of the switch, and to observe behavior of the switch while the data are being conveyed.

29. A product according to claim 28, wherein the instructions cause the primary node to assign the respective one of the nodes by selecting a node that is connected to the respective port by a short path through the network relative to other nodes in the system.

30. A product according to claim 28, wherein the instructions cause the primary node to take the switch being tested and the nodes assigned to the ports thereof off-line, while data transmission unconnected with the test continues among other nodes and switches in the system.

31. A product according to claim 28, wherein the switch is tested by transmitting data from at least one of the assigned nodes to at least one other of the assigned nodes through the corresponding ports at a substantially maximal transmission rate that the transmitting node can achieve.

32. A product according to claim 28, wherein the switch is tested by conveying data through a selected pair of the ports of the switch.

33. A product according to claim 28, wherein the switch is tested by conveying data through substantially all of the ports of the switch.

34. A product according to claim 28, wherein the data are conveyed between the nodes in the form of data packets.

35. A product according to claim 34, wherein in order to detect the fault, a number of the data packets sent by at least one of the assigned nodes is compared to the number of packets received by one or more other assigned nodes, and a discrepancy between the numbers is noted.

36. A product according to claim 34, wherein the switches are arranged so that the data packets may be routed between any pair of the nodes over a plurality of different routes in alternation, and wherein the switch is tested by routing substantially all of the packets conveyed from a first one of the assigned nodes to a second one of the assigned nodes over one assigned route through the switch being tested.

37. A product according to claim 36, wherein the nodes are linked to the network by respective data link adapters, each of which routes data from the respective node through the network in accordance with a routing table stored in a memory thereof, and wherein the test is performed by downloading a test routing table containing the assigned route to the adapter of the first one of the assigned nodes.

38. A computer software product for performing diagnostic testing in a computer network system that includes a multiplicity of nodes interconnected by a network of switches, wherein the nodes are linked to the network by respective data link adapters, each of which is arranged to route data packets from a corresponding one of the nodes through the network to a given destination node over a plurality of different routes in alternation, the product including computer-readable code, which is read by a selected node among the multiplicity of nodes and causes the node to program a selected data link adapter so that substantially all of the data packets sent from the corresponding node to the given destination node are routed in repetition over a single route, whereby when data are transmitted from the corresponding node to the destination node over the single route, operation of the system responsive to the conveyed data is observed so as to identify a fault in the system.

39. A product according to claim 38, wherein the selected data link adapter routes the data packets in accordance with a routing table stored in a memory, and wherein the selected data link adapter is programmed by downloading a test routing table to the memory, responsive to which the data packets are routed in repetition over the single route.

40. A product according to claim 39, wherein the routing table contains multiple entries corresponding to the given destination node, each entry indicating one of the plurality of different routes, from among which entries the switch adapter is arranged to choose the routes in alternation, and wherein the test routing table comprises a plurality of identical entries corresponding to the given destination node.

* * * * *